(12) United States Patent
Yerramalli et al.

(10) Patent No.: US 10,798,602 B2
(45) Date of Patent: Oct. 6, 2020

(54) RADIO RESOURCE MANAGEMENT AND RADIO LINK MONITORING FOR ENHANCED MACHINE TYPE COMMUNICATION IN SHARED SPECTRUM

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/046,868

(22) Filed: Jul. 26, 2018

(65) Prior Publication Data
US 2019/0037427 A1   Jan. 31, 2019

Related U.S. Application Data

(60) Provisional application No. 62/539,449, filed on Jul. 31, 2017.

(51) Int. Cl.
| | |
|---|---|
| *H04W 4/00* | (2018.01) |
| *H04W 24/10* | (2009.01) |
| *H04B 1/713* | (2011.01) |
| *H04W 72/04* | (2009.01) |
| *H04W 36/00* | (2009.01) |
| *H04L 5/00* | (2006.01) |

(52) U.S. Cl.
CPC ............ *H04W 24/10* (2013.01); *H04B 1/713* (2013.01); *H04L 5/0053* (2013.01); *H04W 36/0061* (2013.01); *H04W 72/04* (2013.01); *H04L 5/001* (2013.01); *H04L 5/005* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2012/0063386 A1* | 3/2012 | Park | H04B 7/2606 370/315 |
| 2015/0023197 A1 | 1/2015 | Iraji et al. | |
| 2015/0264592 A1 | 9/2015 | Novlan et al. | |
| 2016/0205692 A1* | 7/2016 | Zhang | H04W 48/12 370/329 |

(Continued)

OTHER PUBLICATIONS

International Search Report and Written Opinion—PCT/US2018/044432—ISA/EPO—dated Oct. 15, 2018.

(Continued)

*Primary Examiner* — Elisabeth Benoit Magloire
(74) *Attorney, Agent, or Firm* — Qualcomm Incorporated

(57) ABSTRACT

Methods, systems, and devices for wireless communication are described. A base station may transmit a configuration for cell measurement associated with a frequency hopping system. The base station may then receive a measurement report based on the configuration. A user equipment (UE) may receive a configuration for cell measurement associated with a frequency hopping system. The UE may generate a measurement report based on the configuration. The UE may then transmit the measurement report to a serving base station.

12 Claims, 18 Drawing Sheets

(56) References Cited

U.S. PATENT DOCUMENTS

| | | | |
|---|---|---|---|
| 2016/0205717 A1* | 7/2016 | Kazmi | H04W 76/15 |
| | | | 455/435.2 |
| 2016/0309468 A1* | 10/2016 | Chen | H04L 5/001 |
| 2017/0070312 A1* | 3/2017 | Yi | H04J 11/0069 |
| 2018/0110057 A1* | 4/2018 | Park | H04W 16/14 |
| 2018/0295612 A1* | 10/2018 | Yi | H04W 64/006 |
| 2019/0028143 A1* | 1/2019 | Zhang | H04L 5/0044 |
| 2019/0037525 A1* | 1/2019 | Liu | H04W 88/06 |
| 2019/0044810 A1* | 2/2019 | Chang | H04W 4/70 |
| 2019/0045372 A1* | 2/2019 | Niu | H04W 4/70 |
| 2019/0166568 A1* | 5/2019 | Tang | H04W 48/16 |
| 2019/0174476 A1* | 6/2019 | Chang | H04L 5/0091 |

OTHER PUBLICATIONS

"MulteFire Release 1.0 Technical Paper a New Way to Wireless", Jan. 20, 2017 (Jan. 20, 2017), pp. 1-25, XP055446360, Retrieved from the Internet: URL: https://www.multefire.org/wp-content/uploads/MulteFire-Release-1.0-whitepaper_FINAL.pdf.

* cited by examiner

RADIO RESOURCE MANAGEMENT AND RADIO LINK MONITORING FOR ENHANCED MACHINE TYPE COMMUNICATION IN SHARED SPECTRUM

CROSS REFERENCE

The present application for patent claims priority to U.S. Provisional Application No. 62/539,449 by Srinivas Yerramalli et al., entitled "RADIO RESOURCE MANAGEMENT AND RADIO LINK MONITORING FOR ENHANCED MACHINE TYPE COMMUNICATION IN SHARED SPECTRUM," filed Jul. 31, 2017 which is assigned to the assignee hereof.

BACKGROUND

The following relates generally to wireless communication, and more specifically to radio resource management (RRM) and radio link monitoring (RLM) for enhanced machine type communication (eMTC) in a shared radio frequency spectrum (or shared spectrum).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may enable communication between a base station and a UE in a frequency hopping system with uncoordinated pseudo random hopping across different base stations. The base station and UE may routinely make physical layer measurements of the radio frequency characteristics. Such measurements may be used to determine handover decisions, adjust power, allocate resources, schedule transmissions, or the like. For example, it may be important to measure the transmissions of other base stations (e.g., neighbor cells or non-serving cells) for RRM and mobility. However, this frequency hopping feature may make it challenging for neighbor cell measurements at the UE as it may be unaware of the frequency hopping pattern of the neighbor cell. Moreover, different neighbor cells may have different channel lists (e.g., list of hopping frequencies) as well as different frequency hopping patterns. Improved techniques for RRM measurement and mobility in a frequency hopping system may thus be desired.

SUMMARY

The described techniques relate to improved methods, systems, devices, and apparatuses that support RRM and RLM for eMTC in shared spectrum. In an aspect, a method for wireless communication includes transmitting a configuration for cell measurement associated with a frequency hopping system and receiving a measurement report based on the configuration. In another aspect, a method for wireless communication includes receiving a configuration for cell measurement associated with a frequency hopping system, generating a measurement report based on the configuration, and transmitting the measurement report.

In some other aspects, an apparatus for wireless communication includes a processor, memory in electronic communication with the processor, and instructions stored in the memory. The instructions are executable by the processor to transmit a configuration for cell measurement associated with a frequency hopping system and receiving a measurement report based on the configuration. In still other aspects, an apparatus for wireless communication includes a processor, memory in electronic communication with the processor, and instructions stored in the memory. The instructions are executable by the processor to receive a configuration for cell measurement associated with a frequency hopping system, generate a measurement report based on the configuration, and transmit the measurement report.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for RRM and RLM, and configuration of measurement gaps and reports are described herein. Aspects of the disclosure are further illustrated by and described with reference to apparatus diagrams, system diagrams, flowcharts, and appendix that support eMTC in a shared spectrum.

Figure 1:
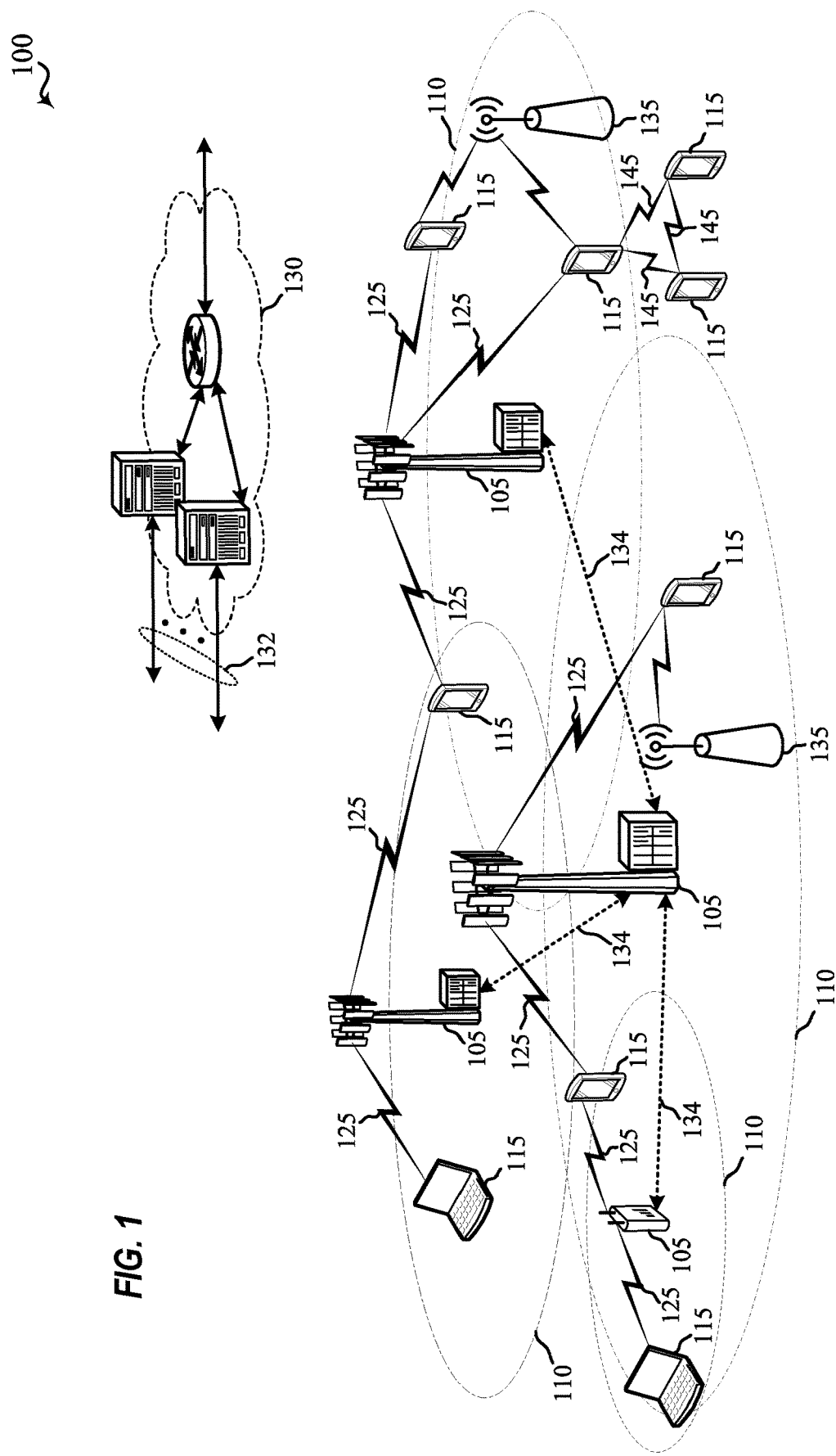
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support RRM and RLM measurement for eMTC in a shared spectrum.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly 145 with other UEs 115 (e.g., using a peer-to-peer (P2P) or device-to-device (D2D) protocol). One or more of a group of UEs 115 utilizing D2D communications 145 may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications 145 may utilize a one-to-many (1:M) system in which each UE 115 transmits to every other UE 115 in the group. In some cases, a base station 105 facilitates the scheduling of resources for D2D communications 145. In other cases, D2D communications 145 are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

According to techniques described herein, wireless communications system 100 may support RRM measurement, RLM measurement, or other types of measurement for eMTC in shared spectrum. Base station 105 may configure the UE 115 for cell measurement associated with a frequency hopping system. UE 115 may generate a measurement report according to the configuration and may transmit the measurement report to base station 105. Base station 105 may use the measurement report to determine handover decisions, adjust power, allocate resources, schedule transmission, or the like.

Figure 2:
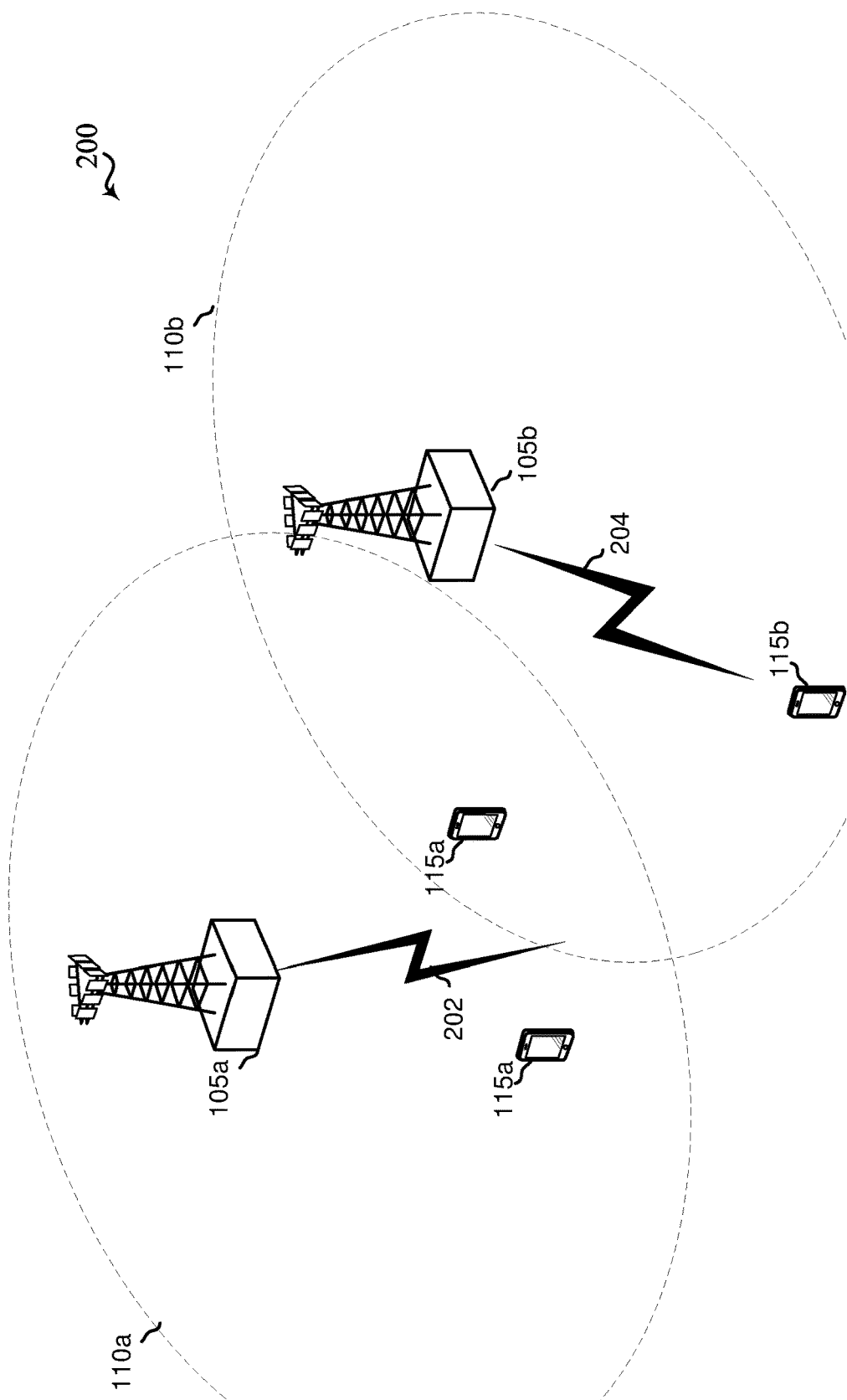
FIG. 2 illustrates an example of a wireless communications system 200 including a frequency hopping scheme that supports RRM and RLM for eMTC in a shared spectrum in accordance with various aspects of the present disclosure.

FIG. 2 illustrates an example of a wireless communications system 200 including a frequency hopping scheme that supports RLM and RRM for eMTC in a shared spectrum in accordance with various aspects of the present disclosure. In some examples, the wireless communications system 200 may include a base station 105a that serves UE 115a, and a base station 105b that serves UE 115b, which may be examples of the corresponding devices as described with reference to FIG. 1. It is understood that only two base stations are illustrated for the sake of simplicity and that more than two base stations may be deployed in the wireless communications system 200.

The base station 105a may communicate 202 over a system operating bandwidth within a coverage area 110a, and the base station 105b may communicate 204 over a system operating bandwidth within a coverage area 110b. For example, the base station 105a may transmit a discovery reference signal (DRS) such as primary and second synchronization signals (PSS/SSS) for cell acquisition procedures with the UE 115a, and the base station 105b may transmit a DRS such as PSS/SSS for cell acquisition procedures for the UE 115b. The DRS may also include a physical broadcast channel (PBCH) transmission. In some examples, the PBCH transmission may include subframe timing information, frame timing information, a frequency hopping bandwidth, a number of hopping frequencies (or hop frequencies), a location of system information, a frame structure for a data channel, other type of system information, or a combination thereof. The UE may decode the PBCH, and thus may obtain system information for establishing a connection with base station.

Following cell acquisition and connection establishment, the base station 105a may transmit a data channel to the UE 115a, and vice a versa. Further, the base station 105b may transmit a data channel to the UE 115b, and vice a versa. The base station 105a,105b and the UE 115a,115b may routinely make physical layer measurements of the radio frequency characteristic of the operating environment. For example, to support mobility, it may be important to measure the transmissions of other base stations or neighbor cells in deciding which of the neighbor cells to select for handover or cell reselection. In this regard, the base station 105a may configure the UE 115a with one or more parameters associated with the base station 105b for RRM measurement and reporting. Likewise, the base station 105b may configure the UE 115b with one or more parameters associated with the base station 105a for RRM measurement and reporting. In some examples, RRM measurement may include a reference signal received quality (RSRQ), a reference signal receive power (RSRP), a reference signal strength indicator (RSSI), or some combination thereof.

Additionally, when operating in connected mode, the UE 115a,115b may experience interference such that it may no longer be able to maintain connection with the base station 105a, 105b, respectively. Accordingly, it may be important for the UE 115a,115b to perform RLM, and if applicable, declare radio link failure (RLF) to base station and end the connection. The base stations 105a,105b may configure their respective UE 115a,115b with one or more parameters for RLM measurement. The procedures for configuring the UE for cell measurement and reporting will be described in detail below.

Figure 3:
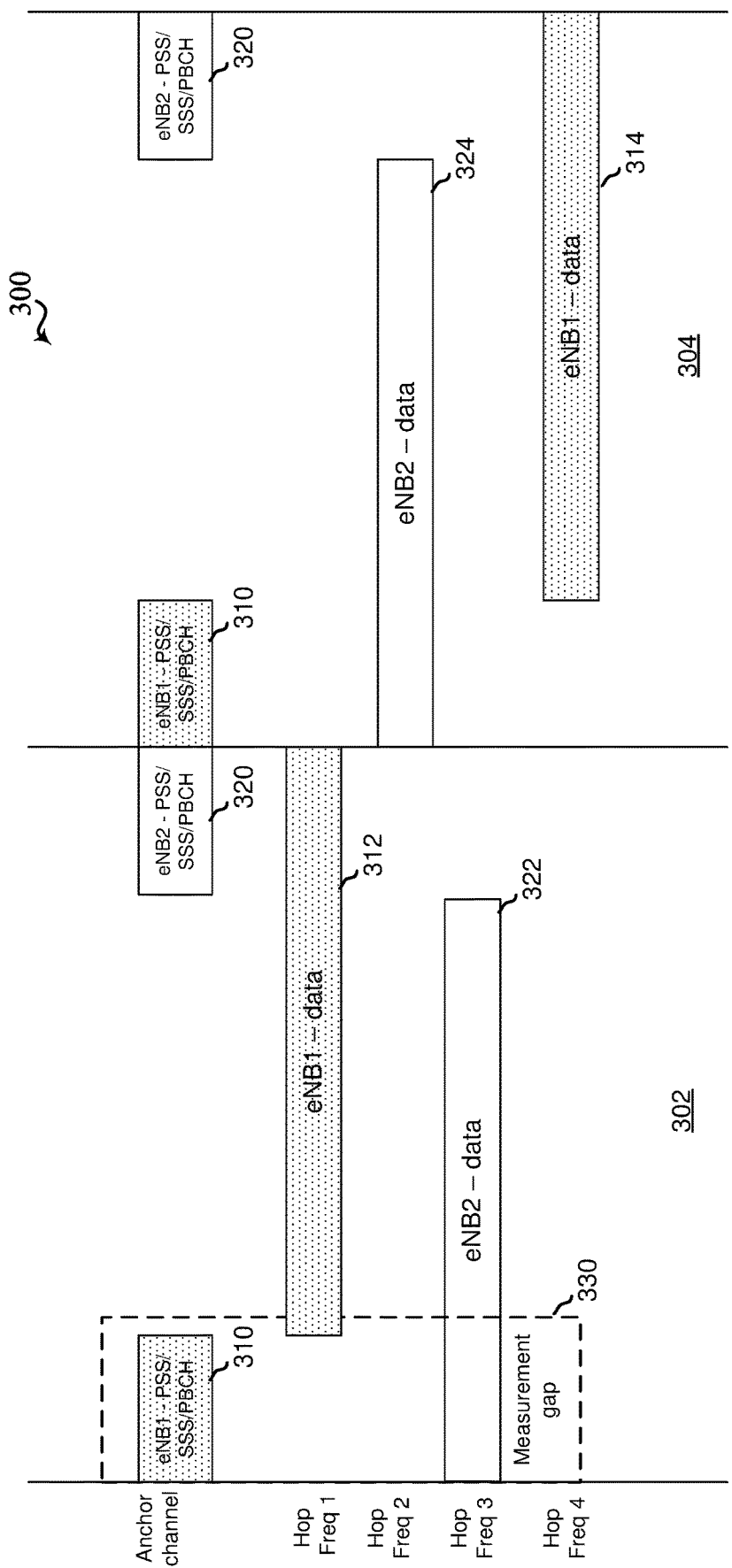
FIG. 3 illustrates an example of a synchronous transmission scheme in a frequency hopping system that supports RRM and RLM for eMTC in a shared spectrum in accordance with aspects of the present disclosure.

FIG. 3 illustrates an example of a synchronous transmission scheme 300 in a frequency hopping system that supports RRM and RLM for eMTC in a shared spectrum in accordance with various aspects of the present disclosure. In some examples, the synchronous transmission scheme 300 may be implemented in the wireless communication system 200 as described with reference to FIG. 2.

Specifically in FIG. 3, the base stations 105a (referred to as eNB1) and 105b (referred to as eNB2) may operate in a synchronous network where system timing may be aligned across base stations. Additionally, the base stations 105a and 105b may be implemented in a frequency hopping system with uncoordinated pseudo random hopping across different base stations. The frequency hopping system may include a designated anchor frequency or channel (referred to as anchor channel) for enabling fast cell discovery, and a plurality of hopping frequencies (or hop frequencies) for data transmission or the like.

For example, in hopping frame 302, the base station 105*a* may transmit a DRS 310 (e.g., PSS/SSS and PBCH) on an anchor channel at the start of the hopping frame 302, and then may hop to a hopping frequency 1 (referred to as Hop Freq 1 in FIG. 3) to transmit a non-DRS channel, such as a data channel 312. In hopping frame 302, the base station 105*b* may transmit a data channel 322 on Hop Freq 3 at the start of the hopping frame 302, and then may hop to the anchor channel to transmit a DRS 320.

In the next hopping frame 304, the base station 105*a* may hop back to the anchor channel to transmit DRS 310, and then may hop to Hop Freq 4 to transmit a data channel 314. The base station 105*b* may hop to Hop Freq 2 to transmit a data channel 324 at the start of hopping frame 304, and then may hop to the anchor channel to transmit the DRS 320. In some cases, the base station may perform multiple data channel transmission on multiple hop frequencies before returning to the anchor channel to transmit the DRS.

In some examples, the data channels 312,314,322,324 may include a TDD configuration having one or more downlink (DL) subframes and one or more uplink (UL) subframes. The TDD configuration may be referred to as TDD frame structure or DL-UL configuration. The base station may transmit downlink channels (e.g., physical downlink control channel (PDCCH), physical downlink shared channel (PDSCH), etc.) in DL subframes, and the UE may transmit uplink channels (e.g., physical uplink control channel (PUCCH), physical uplink shared channel (PUSCH), etc.) in UL subframes. In some cases, the TDD frame structure (DL-UL configuration) may be dynamic per hop frequency per base station. For examples, a DL subframe (default direction is DL) may dynamically change or flip to an UL direction, and vice versa within a given frame.

It should be noted that the transmission time on the anchor channel (e.g., 5 ms) may be small relative to transmission on the hopping frequency (e.g., 80 ms). On average, the amount of time spent on every channel may be substantially equal in such a frequency hopping scheme. Further, it is contemplated that there may be more than one designated anchor channel In that regard, one may frequency division multiplex (FDM) different base stations of a same operator, or FDM different operators. Moreover, it is understood that there may be more than four hop frequencies as shown and may depend the size of the system operating bandwidth.

As described with reference to FIG. 2, the UE 115*b* served by base station 105*b* may be configured to measure transmissions of the base station 105*a* to support mobility. In some examples, the UE 115*b* may be configured with one or more parameters associated with neighbor cell, such as the base station 102*a* (eNB1), for neighbor cell measurement. For example, the configuration may include a cell ID (e.g., PCID), a channel list (e.g., list of hop frequencies), and a hopping pattern associated with the channel list. In some examples, the cell ID, channel list, and hopping pattern may be explicitly conveyed to the UE. In other examples, the hopping pattern may be implicitly determined based on the cell ID, channel list or combination thereof.

In some examples, the configuration may also include a location (e.g., offset) of the DRS 310 with respect to the hopping frame 302,304. The UE 115*b* may need to be aware of whether the DRS comes before or after the data channel. In some other examples, the configuration may include a measurement gap 330 that is configured to cover most of the DRS 310 and none (to very little) of the data channel 312 of the base station 105*a* (eNB1). Thus, in the hopping frame 302, the UE 115*b* may hop to the anchor channel to measure the DRS 310 of the base station 105*a* (eNB1) during the measurement gap 330, and then hop back to Hop Freq 3 to receive the data channel 322 of the serving base station 105*b* (eNB2). The UE 115*b* may report measurements to the serving base station 105*b* on a hop frequency as will be described in more detail below.

As described herein, the DRS 310 may include PSS/SSS and PBCH of the base station 105*a* (eNB1). For reference signal receive power (RSRP) measurement, the UE may descramble reference signals (e.g., common reference signals or cell-specific reference signals (CRS)) carried on PBCH and perform the measurement. The DRS may enable the UE to obtain cell ID, timing information, and frequency synchronization. However, in some cases, the number of subframes used for PBCH may not be sufficient to get a good RSRP measurement. Thus, in some examples, the UE may perform RSRP measurement on the PSS/SSS and may combine it with RSRP measurement on the PBCH. The UE may need to know a power relationship between the PSS/SSS and PBCH in order to combine the RSRP measurements. Therefore, in some cases, the base station may need to ensure that PSS/SSS and PBCH are transmitted from same antenna port and at equal transmit power. In other cases, the base station may transmit an indication that the PSS/SSS and PBCH are transmitted from a same antenna port, and a power delta relationship between PSS/SSS and PBCH to enable the UE to properly combine RSRP measurement on PSS/SSS and PBCH.

It should be noted that although one neighbor cell is shown in FIGS. 2 and 3, it is understood that the UE may be configured with more than one neighbor cell for RRM measurement or the like. Moreover, it is contemplated that different cells may have different channel lists as well as different hopping patterns based on a different operating environment at each cell. Therefore, the UE may be configured with a channel list and hopping pattern on a per cell basis. Also, the measurement gap may be configured on a per cell basis as well. Accordingly, the UE may determine where its neighbor cell channel will be for cell measurement.

Additionally, the UE 115*a*,115*b* may perform measurements for RLM. The UE may compute a signal-to-interference-plus-noise ratio (SINR) of the PDCCH and may predict an error rate probability for PDCCH based on this computation. If the probability reaches a certain threshold, the UE may declare RLF to serving base station and end the connection. UE may attempt to reconnect with the base station or possibly attempt to connect to another base station (neighbor cell) with a stronger signal. Thus, measuring an average SINR the UE may be operating in becomes an important part of RLM.

In a frequency hopping system in a shared spectrum (e.g., 2.4 GHz), there may be some hop frequencies that are impacted by local transmitting devices (e.g., LAA devices, LTE-U devices, WiFi devices, Bluetooth devices, etc.) while other hop frequencies may experience less interference. Generally, the UE 115*a*,115*b* may operate in a system bandwidth that may include a large number of hop frequencies, such as 50 or 100 hop frequencies. In this regard, the connection to the serving base station (serving cell) may already have failed if the UE had to run through all hop frequencies before performing an RLM update. In some examples, the base station may configure the UE with a set of hopping frequencies (from all available hop frequencies) for RLM measurement.

In some other examples, the base station may indicate a number of channels for measuring SINR and may configure the UE to compute the SINR from B best channels, W worst channels, M median channels, or some combination thereof.

Parameter B, W, M may be an integer, and may a value or different values. For example, the UE may be configured to compute SINR of the 5 best channels, or 5 worst channels, or 5 channels closest to the median SINR. In other examples, the base station may configure a measurement that combines an SINR of DRS with an SINR of data channel for RLM measurement. In still other examples, the base station may configure a measurement that computes an average SINR over the last N hop frequencies on which the UE detects a transmission. These various examples may be selected based on how accurate base station wants the measurements to be, how mobile the UE is, or some other criteria. It should be noted that these considerations may apply to RRM measurements as well, such as RSRQ, RSRP, RSSI, or combination thereof.

Figure 4:
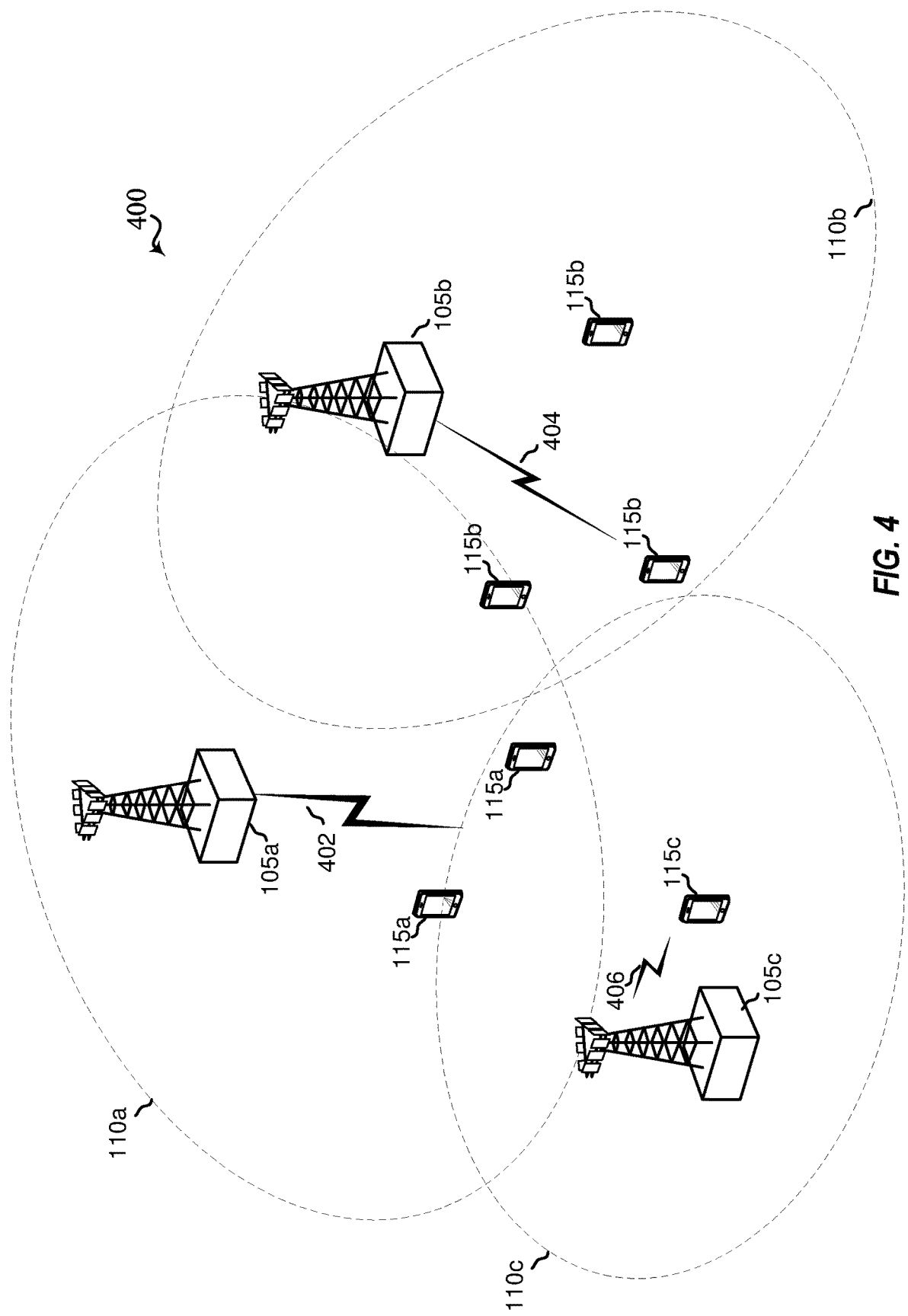
FIG. 4 illustrates an example of a wireless communications system including a frequency hopping scheme that supports RRM and RLM for eMTC in a shared spectrum in accordance with aspects of the present disclosure.

FIG. 4 illustrates an example of a wireless communications system 400 including a frequency hopping scheme that supports RRM and RLM for eMTC in a shared spectrum in accordance with various aspects of the present disclosure. The wireless communications system 400 may be similar to the wireless communications system 200 described with reference to FIG. 2 except that three base stations are shown in this example. Here, the wireless communications system 400 may include a base station 105a that serves UE 115a, a base station 105b that serves UE 115b, and a base station 105c that serves UE 115c, which may be examples of the corresponding devices as described with reference to FIG. 1. It is understood that only three base stations are illustrated for the sake of simplicity and that more than three base stations may be deployed in the wireless communications system 400.

The base station 105a may communicate 402 over a system operating bandwidth within a coverage area 110a, the base station 105b may communicate 404 over a system operating bandwidth within a coverage area 110b, and the base station 105c may communicate 406 over a system operating bandwidth within a coverage area 110c. In some examples, to support mobility, it may be important to measure the transmissions of other base stations or neighbor cells in deciding which of the neighbor cells to select for handover or cell reselection. In this regard, the base station 105a may configure the UE 115a with one or more parameters associated with the base stations 105b and 105c for RRM measurement and reporting. Likewise, the base station 105b may configure the UE 115b with one or more parameters associated with the base stations 105a and 105c, and the base station 105c may configure the UE 115c with one or more parameters associated with the base stations 105a and 105b for RRM measurement and reporting.

Additionally, when operating in connected mode, the UE 115a,115b,115c may experience interference such that it may no longer be able to maintain connection with the base station 105a,105b,105c, respectively. Accordingly, it may be important for the UE 115a,115b,115c to perform RLM, and if applicable, declare radio link failure (RLF) to base station and end the connection. The base stations 105a,105b,105c may configure their respective UE 115a,115b,115c with one or more parameters for RLM measurement. The procedures for configuring the UE for cell measurement and reporting will be described in more detail below.

Figure 5:
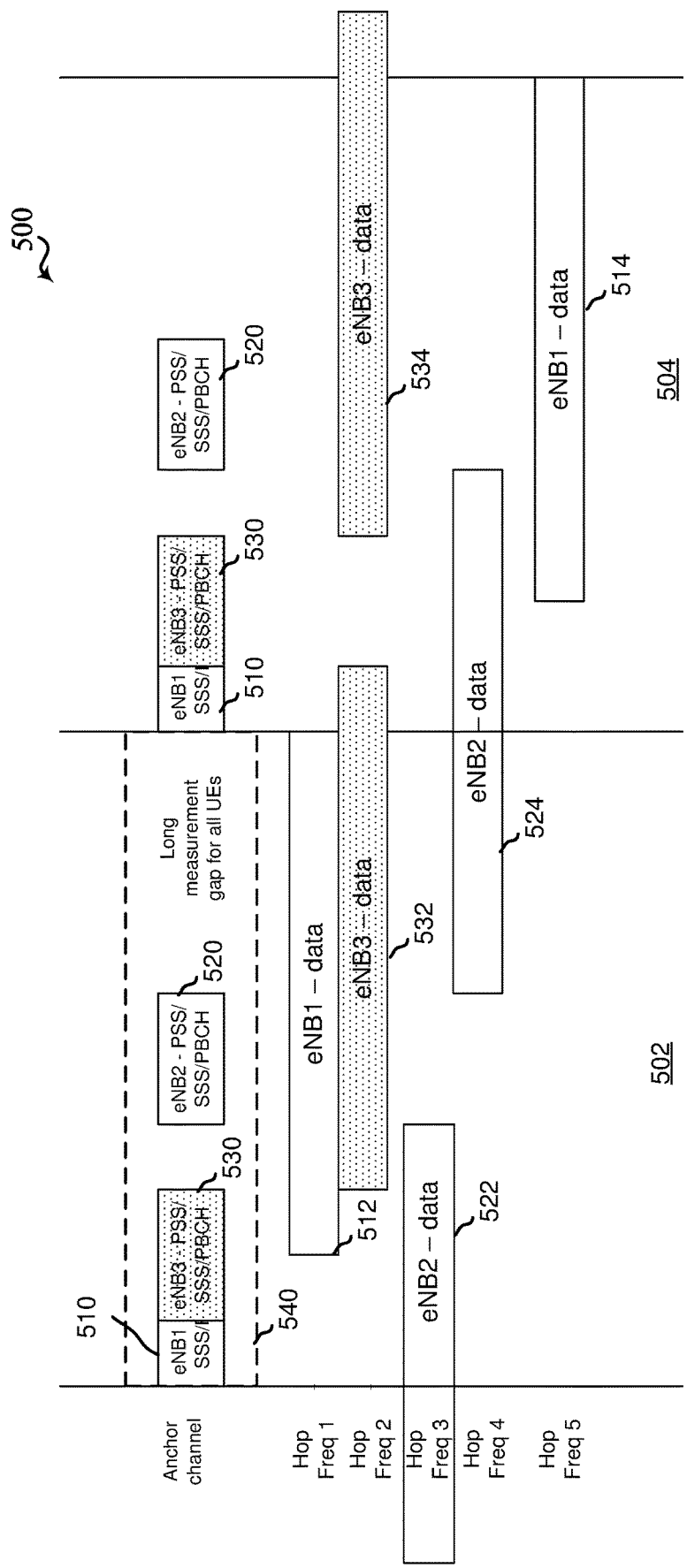
FIG. 5 illustrates an example of an asynchronous transmission scheme of a frequency hopping system that supports RRM and RLM for eMTC in a shared spectrum in accordance with aspects of the present disclosure.

FIG. 5 illustrates an example of an asynchronous transmission scheme 500 in a frequency hopping system that supports RRM and RLM for eMTC in a shared spectrum in accordance with various aspects of the present disclosure. In some examples, the asynchronous transmission scheme 500 may be implemented in the wireless communication system 400 as described with reference to FIG. 4.

Specifically in FIG. 5, the base stations 105a (referred to as eNB1), 105b (referred to as eNB2), and 105c (referred to as eNB3) may operate in an asynchronous network where system timing may not be aligned across base stations. Additionally, the base stations 105a and 105b may be implemented in a frequency hopping system with uncoordinated pseudo random hopping across different base stations. The frequency hopping system may include a designated anchor frequency or channel (referred to as anchor channel) for fast cell discovery, and a plurality of hopping frequencies (or hop frequencies) for data transmission or the like.

For example, in hopping frame 502, the base station 105a may transmit a DRS 510 (e.g., PSS/SSS and PBCH) on an anchor channel at the start of the hopping frame 502, and then may hop to Hop Freq 1 to transmit a non-DRS channel, such as a data channel 512. In contrast to the synchronous transmission scheme 300 as described with reference to FIG. 3, the base stations 105b and 105c may operate asynchronously in time with respect base station 105a (as well as with respect to each other). In this regard, the base station 105b may transmit a data channel 522 on Hop Freq 3 that may not be aligned with a frame boundary (system timing) associated with the base station 105a (as well as the base station 105c), and then may hop to the anchor channel to transmit a DRS 520. The base station 105c may transmit a DRS 530 that partially overlaps with the DRS 510 of the base station 105a, and then may hop to Hop Freq 2 to transmit a data channel 532.

In the next hopping frame 504, the base station 105a may hop back to the anchor channel to transmit the DRS 510, and then may hop to Hop Freq 5 to transmit a data channel 514. The base station 105b may hop to Hop Freq 4 to transmit a data channel 524 according to its system timing, and then may hop to the anchor channel to transmit the DRS 520. The base station 105c may hop to the anchor channel to transmit the DRS 530 according to its system timing, and then may hop to Hop Freq 2 to transmit a data channel 534. In some cases, the base station may perform multiple data channel transmission on multiple hop frequencies before returning to the anchor channel to transmit the DRS.

In some examples, the data channels 512,514,522,524, 532,534 may include a TDD configuration having one or more downlink (DL) subframes and one or more uplink (UL) subframes. The TDD configuration may be referred to as TDD frame structure or DL-UL configuration. The base station may transmit downlink channels (e.g., PDCCH, PDSCH, etc.) on DL subframes, and the UE may transmit uplink channels (e.g., PUCCH, PUSCH, etc.) on UL subframes. In some cases, the TDD frame structure (DL-UL configuration) may be dynamic per hop frequency per base station. For examples, a DL subframe (default direction is DL) may dynamically change or flip to an UL direction, and vice versa within a given frame.

It should be noted that the transmission time on the anchor channel (e.g., 5 ms) may be small relative to transmission on the hopping frequency (e.g., 80 ms). On average, the amount of time spent on every channel may be substantially equal in such a frequency hopping scheme. Further, it is contemplated that there may be more than one designated anchor channel, and that one may frequency division multiplex (FDM) different base stations of a same operator, or FDM different operators. Moreover, it is understood that there may be more than five hop frequencies as shown and the number of hop frequencies may depend the size of the system operating bandwidth.

As noted in FIG. 4, to support mobility, it may be important to measure the transmissions of other base stations or neighbor cells in deciding which of the neighbor cells to select for handover or cell reselection. In this regard, the base station 105a may configure the UE 115a with one or more parameters associated with the base stations 105b and 105c for RRM measurement and reporting. Likewise, the base station 105b may configure the UE 115b with one or more parameters associated with the base stations 105a and 105c, and the base station 105c may configure the UE 115c with one or more parameters associated with the base stations 105a and 105b for RRM measurement and reporting. In some examples, the configuration may be similar to the one described with reference to FIG. 3 including cell ID, channel list, hopping pattern, location of DRS, and measurement gap.

In some other examples, a long measurement gap 540 may be configured for all UEs 115a,115b,115c for neighbor cell measurement. As noted above, the system timing may not be aligned across the base stations in the asynchronous transmission scheme 500. Thus, a duration of the long measurement gap 540 may be configured to cover the DRS 510,520,530 of the base stations 105a,105b,105c which is the entire duration of a frame in this example. In still other examples, the duration of a long measurement gap may be configured to be more than a frame in order to cover the DRS from all base stations in the system. Thus, the UE may detect all base stations and their respective delay offsets within the long measurement gap, and report this information to its serving base station. The serving base station may then configure one or more measurement gaps (per neighbor cell or group of neighbor cells) to measure data channel for RRM measurement, such as RSPR, RSRQ, RSSI, or a combination thereof. The configuration for measuring non-DRS transmission will be described in more detail below.

Figure 6:
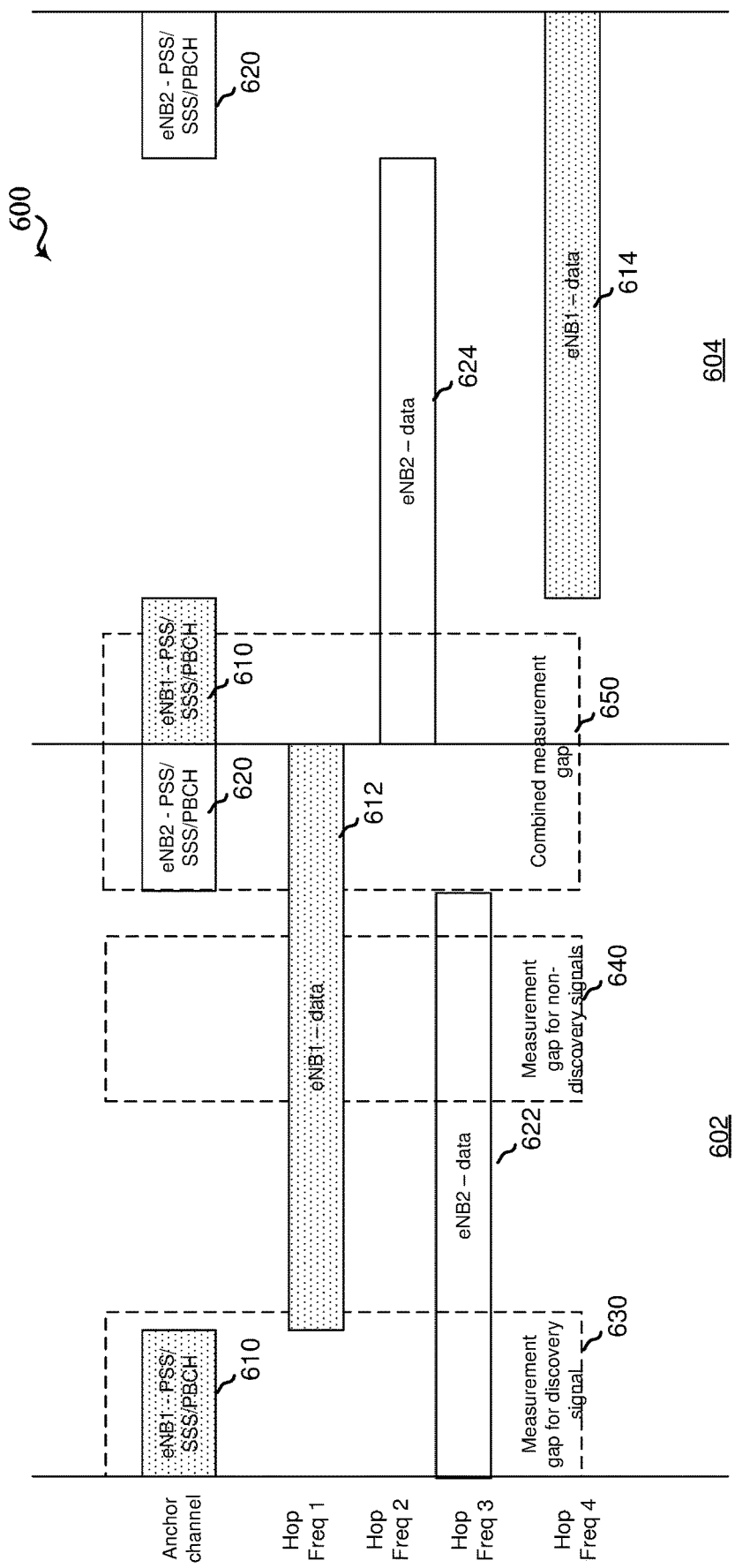
FIG. 6 illustrates an example of a synchronous transmission scheme of a frequency hopping system that supports RRM and RLM for eMTC in a shared spectrum in accordance with aspects of the present disclosure.

FIG. 6 illustrates an example of a synchronous transmission scheme 600 in a frequency hopping system that supports RRM and RLM for eMTC in a shared spectrum in accordance with various aspects of the present disclosure. In some examples, the synchronous transmission scheme 600 may be implemented in the wireless communication system 200 as described with reference to FIG. 2. In some other examples, the synchronous transmission scheme 600 may be similar to the one described with reference to FIG. 3.

Specifically in FIG. 6, the base stations 105a (referred to as eNB1) and 105b (referred to as eNB2) may operate in a synchronous network where all base stations are synchronous in time (e.g., system timing aligned across base stations). Additionally, the base stations 105a and 105b may be implemented in a frequency hopping system with uncoordinated pseudo random hopping across different base stations. The frequency hopping system may include a designated anchor frequency or channel (referred to as anchor channel) for fast cell discovery, and a plurality of hopping frequencies (or hop frequencies) for data transmission.

For example, in hopping frame 602, the base station 105a may transmit a DRS 610 (e.g., PSS/SSS and PBCH) on anchor channel at the start of the hopping frame 602, and then may hop to Hop Freq 1 to transmit a non-DRS channel, such as a data channel 612. In hopping frame 602, the base station 105b may transmit a data channel 622 on Hop Freq 3 at the start of the hopping frame 602, and then may hop to the anchor channel to transmit a DRS 620.

In the next hopping frame 604, the base station 105a may hop back to the anchor channel to transmit the DRS 610, and then may hop to Hop Freq 4 to transmit a data channel 614. The base station 105b may hop to Hop Freq 2 to transmit a data channel 624 at the start of hopping frame 604, and then may hop to the anchor channel to transmit the DRS 620. In some cases, the base station may perform multiple data channel transmission on multiple hop frequencies before returning to the anchor channel to transmit the DRS.

In some examples, the data channels 612,614,622,624 may include a TDD configuration having one or more downlink (DL) subframes and one or more uplink (UL) subframes. The TDD configuration may be referred to as TDD frame structure or DL-UL configuration. The base station may transmit downlink channels (e.g., PDCCH, PDSCH, etc.) on DL subframes, and the UE may transmit uplink channels (e.g., PUCCH, PUSCH, etc.) on UL subframes. In some cases, the TDD frame structure (DL-UL configuration) may be dynamic per hop frequency per base station. For examples, a DL subframe (default direction is DL) may dynamically change or flip to an UL direction, and vice versa within a given frame.

As noted in FIGS. 2 and 3, the UE 115b served by the base station 105b may be configured to measure transmissions of the base station 105a to support mobility. In some examples, the UE 115b may be configured with one or more parameters associated with neighbor cell, such as the base station 102a (eNB1), for neighbor cell measurement. In some examples, the configuration may be similar to the one described with reference to FIG. 3 including cell ID, channel list, hopping pattern, location of DRS, and measurement gap.

In some other examples, the configuration may include a measurement gap 630 that is configured to cover most of the DRS 610 and none (to very little) of the data channel 612 of the base station 105a (eNB1). Thus, in hopping frame 602, the UE 115b may hop to the anchor channel to measure the DRS 610 of the base station 105a (eNB1) during the measurement gap 630, and then hop back to Hop Freq 3 to receive the data channel 622 of its serving base station 105b (eNB2). The UE may measure the DRS and report the measurements in a similar manner as described with reference to FIG. 3.

In other examples, the configuration may include a measurement gap 640 that is configured to cover a portion of non-DRS transmission, such as the data channel 612 of the base station 102a. In some cases, it may be beneficial to measure data channel (non-DRS transmission) for a RSRP measurement. For example, it is contemplated that the anchor channel may be cleaner (less interference) so it may be deployed where LBT is more likely to be successful. Measurement of the hop frequencies over which data channels are to be transmitted may be more reflective of what UE may need to sufficiently receive data transmissions. More specifically, the UE may perform RSRP on references signals, such as CRS, channel state information reference signals (CSI-RS), or the like, carried on the data channel.

In some examples, the base station may configure the UE to report RSRP measurement on the DRS, RSRQ measurement on the DRS, RSRP measurement on the data channel, RSRQ on the channel, RSRQ measurement on the DRS and data channel, or some combination thereof. Thus, the base station may configure the UE with a measurement gap for DRS separate from a measurement gap for data channel. Furthermore, in cases where the UE is configured to combine measurements from DRS and data channel, the base station may need to signal a power delta relationship between DRS and data channel. For example, the DRS may always be transmitted in six resource blocks whereas the data channel may be transmitted in two or four narrow bands with frequency hopping. Accordingly, UE may need to know the power relation of DRS and data channel to properly combine the measurements.

In some examples, the data channels 612,614,622,624 may include a TDD configuration with one or more DL subframes and one or more UL subframes, and DL-UL configuration may be dynamic within a given frame. When configuring a measurement gap for data channel, the base station may take steps to ensure that the measurement gap occurs in a DL portion of data channel of the other base station. For example, the base station 105b (eNB2) may coordinate with base station 105a over X2 interface or other interface, to enable such a measurement. Base station 105a may clear and grab the medium (e.g., LBT procedure), and transmit DL channels for the entire duration. In another example, the base station 105a may transmit the data channel 612 that includes a guaranteed DL portion which is not able to change or flip to the uplink direction. Thus, the base station 102b may configure a measurement gap 640 to occur only in the guaranteed DL portion of data channel 612.

At the start of hopping frame 602, the UE 115b may be tuned to Hop Freq 3 to receive the data channel 622 of its serving base station 105b. At the start of measurement gap 640, UE 115 may hop (re-tune) to Hop Freq 1 to measure the data channel 612 of base station 105a. In shared spectrum, it is noted that base station 105a may perform an LBT procedure, and if successful, may grab the medium and transmit data channel 612. If not successful, the base station 105a would not transmit and wait for the next transmission opportunity and perform LBT again. In this regard, the UE may need to first detect whether the base station 105a actually transmitted something, and if so, the UE may then perform measurements on the data channel 612. If the UE did not detect an actual transmission from the base station 105a, the UE may skip the measurement at this time instant. In some examples, the base station may configure multiple measurement gaps to measure multiple data channels.

In still other examples, the UE 115a may be configured with a measurement gap 650 that is configured to cover the DRS 620 and a portion of the data channel 624 of base station 105b (eNB2). In this example, the UE 115a may be tuned to anchor channel at the start of the hopping frame 602 and may receive the DRS 610. The UE 115a may then hop (re-tune) to Hop Freq 1 to receive the data channel 612 of the base station 105a. In some designs, the initial portion of the data channel 612 may include important information such as transmission opportunity duration (TxOP), frame structure, control channel, and the like. The measurement gap 640 may be configured in such a manner that the UE 115a may receive its data on the data channel 612, then hop to the anchor channel to measure the DRS 620 and hop to Hop Freq 2 to measure the data channel 624 within the measurement gap 640, and may return to the anchor channel or Hop Freq 4 in the next hopping frame 604.

Figure 7:
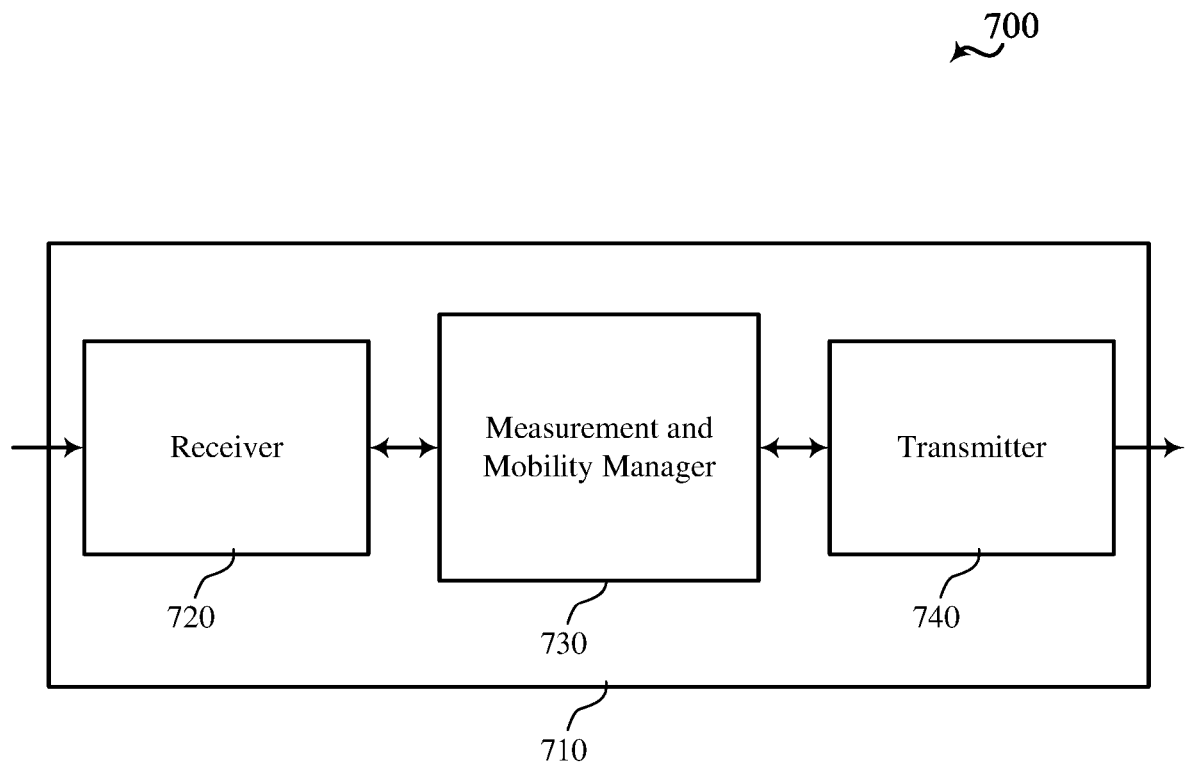
FIGS. 7 and 8 illustrate block diagrams of a device that supports RRM and RLM for eMTC in a shared spectrum in accordance with aspects of the present disclosure.

FIG. 7 shows a block diagram 700 of a wireless device 710 that supports RRM and RLM for eMTC in a shared spectrum in accordance with aspects of the present disclosure. The wireless device 710 may be an example of aspects of a base station 105 as described herein. The wireless device 710 may include a receiver 720, a measurement and mobility manager 730, and a transmitter 740. The wireless device 705 may also include a processor. Each of these components may be in communication with one another (e.g., via one or more buses).

The receiver 720 may receive information such as packets, user data, or control information associated with various information channels (e.g., control channels, data channels, and information related to RRM measurement and RLM measurement for eMTC in shared spectrum, etc.). Information may be passed on to other components of the device. The receiver 720 may be an example of aspects of the transceiver 935 described with reference to FIG. 9. The receiver 720 may utilize a single antenna or a set of antennas.

The measurement and mobility manager 730 may be an example of aspects of the base station measurement and mobility manager 915 described with reference to FIG. 9.

The measurement and mobility manager 730 and/or at least some of its various sub-components may be implemented in hardware, software executed by a processor, firmware, or any combination thereof. If implemented in software executed by a processor, the functions of the measurement and mobility manager 730 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The measurement and mobility manager 730 and/or at least some of its various sub-components may be physically located at various positions, including being distributed such that portions of functions are implemented at different physical locations by one or more physical devices. In some examples, the measurement and mobility manager 730 and/or at least some of its various sub-components may be a separate and distinct component in accordance with various aspects of the present disclosure. In other examples, the measurement and mobility manager 730 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The measurement and mobility manager 730 may configure one or more parameters for cell measurement associated with a frequency hopping system. The configuration may include a cell identification (ID) of at least one neighbor cell, a channel list associated the at least one neighbor cell, and a hopping pattern associated with the channel list. The configuration may also include a location of a DRS with respect to a hopping frame corresponding to the hopping pattern. The configuration may also include at least one measurement gap for measuring a DRS, a data channel, or combination thereof. The configuration may also include a set of hopping frequencies for radio link monitoring measurement. The configuration may also include a type of measurement to be reported.

The transmitter 740 may transmit signals generated by other components of the device. In some examples, the transmitter 740 may be collocated with a receiver 720 in a transceiver module. For example, the transmitter 740 may be an example of aspects of the transceiver 935 described with reference to FIG. 9. The transmitter 740 may utilize a single antenna or a set of antennas.

The transmitter 740 may transmit the configuration for cell measurement associated with a frequency hopping system, a power delta relationship between different signals for combining measurements, an indication to combine measurements of different signals for reporting, an indication to separately report measurement of different signals, an indication of a number of channels to measure for radio link monitoring.

Figure 8:
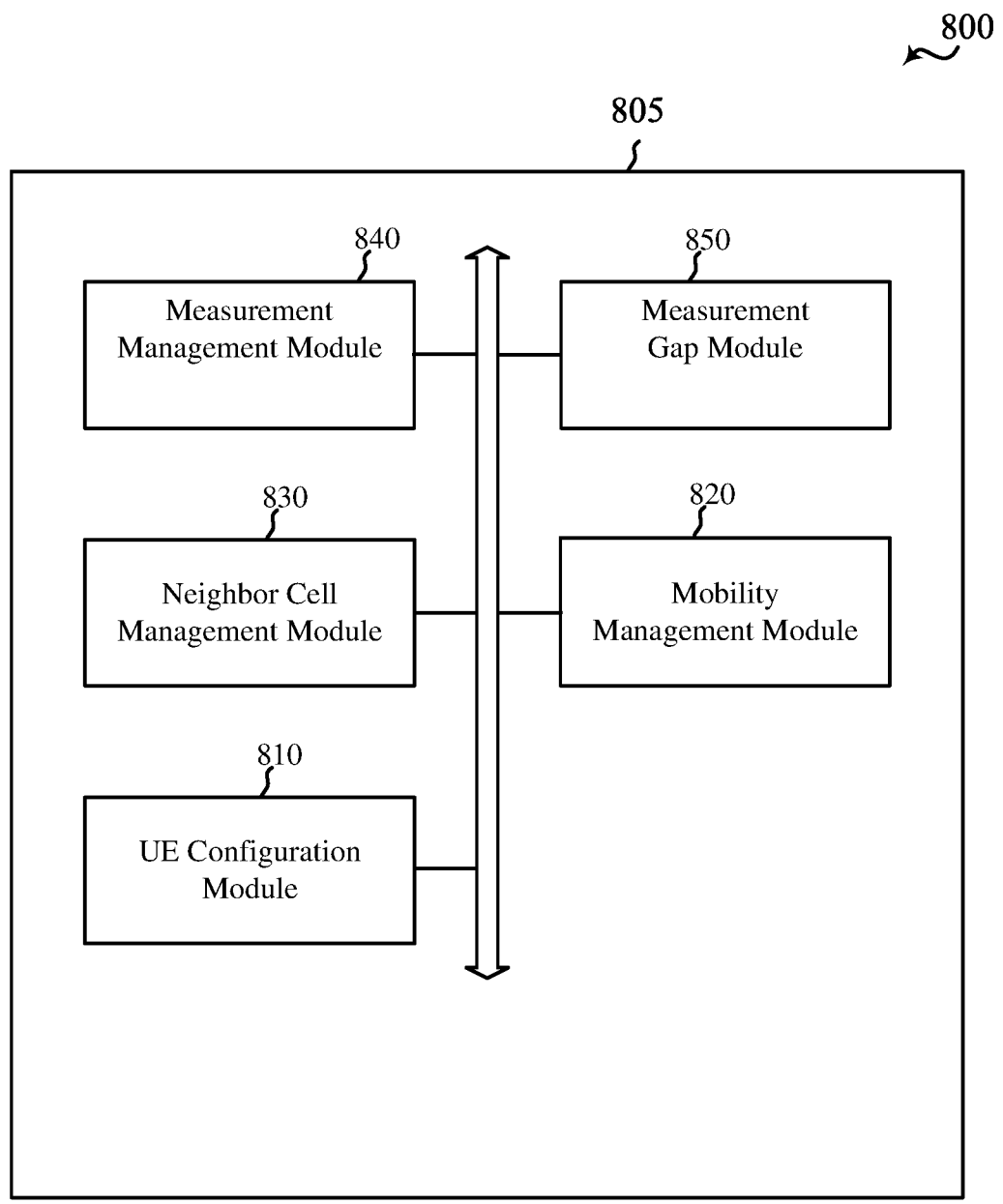

FIG. 8 shows a block diagram 800 of a wireless device 805 that supports RRM and RLM for eMTC in a shared spectrum in accordance with aspects of the present disclosure. The wireless device 805 may be an example of aspects of the wireless device 710 or the base station 105 as described herein. The wireless device 805 may include a UE configuration module 810, mobility management module 820, neighbor cell management module 830, measurement management module 840, and measurement gap module 850. The wireless device 805 may also include a processor. Each of these components may be in communication with one another (e.g., via one or more buses).

The UE configuration module 810 may configure UE with one or more parameters for cell measurement associated with a frequency hopping system. The configuration may include various examples as described herein.

The mobility management module 820 may receive measurement reports associated with a frequency hopping system, and manage mobility of the UE based the measurement reports. For example, the mobility management module 820 may determine handover decisions or cell reselection.

The neighbor cell management module 830 may receive reports of neighbor cells from the UE, and may update a neighbor list for the UE. The neighbor cell management module 830 may maintain information associated with a neighbor cell in a frequency hopping system, such as cell ID, channel list, and hopping pattern associated with the channel list. The neighbor cell management module 830 may add or remove neighbor cells from the list and may rank neighbor cells handover or cell reselection based on the reports.

The measurement management module 840 may maintain and update measurement reports from the UE. The measurement reports may include RSRQ, RSRP, RSSI, or the like.

The measurement gap module 850 may receive information from the neighbor cell management module 830 and determine measurement gap per neighbor cell or per group of neighbor cells. The measurement gap module 850 may configure a measurement gap for the DRS, a measurement gap for the data channel, a combined measurement gap for both the DRS and data channel, a long measurement gap for the DRS of all neighbor cells, or some combination thereof.

Figure 9:
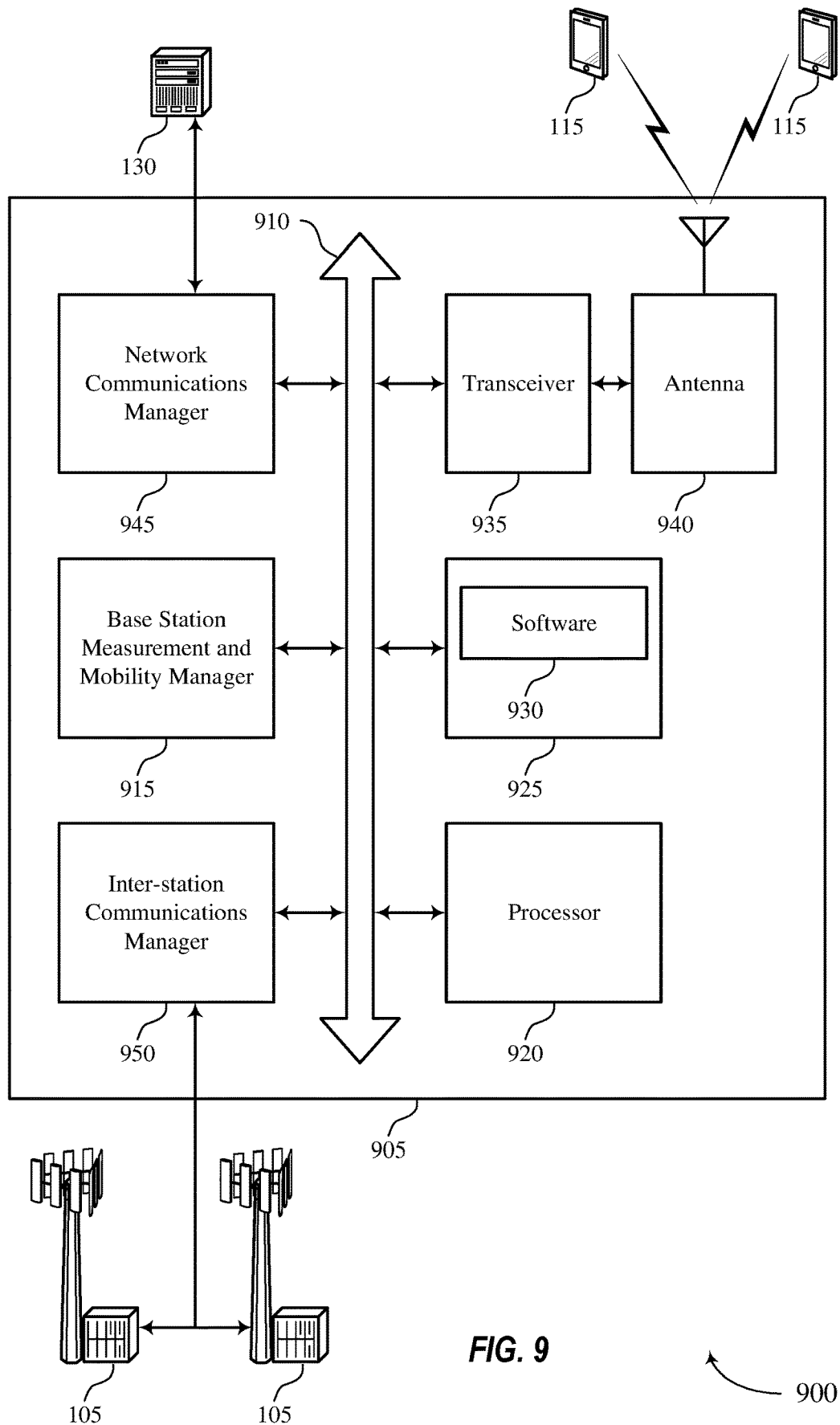
FIG. 9 illustrates a block diagram of a system including a base station that supports RRM and RLM for eMTC in a shared spectrum in accordance with aspects of the present disclosure.

FIG. 9 shows a diagram of a system 900 including a device 905 that supports RRM and RLM measurement for eMTC in a shared spectrum in accordance with aspects of the present disclosure. The device 905 may be an example of or include the components of the wireless device 710, wireless device 805, or the base station 105 as described herein. The device 905 may include components for bi-directional voice and data communications including components for transmitting and receiving communications, including a base station measurement and mobility manager 915, processor 920, memory 925, software 930, transceiver 935, antenna 940, network communications manager 945, and inter-station communications manager 950. These components may be in electronic communication via one or more buses (e.g., bus 910). The device 905 may communicate wirelessly with one or more UEs 115.

The processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 920 may be configured to operate a memory array using a memory controller. In other cases, a memory controller may be integrated into the processor 920. The processor 920 may be configured to execute computer-readable instructions stored in a memory to perform various functions (e.g., functions or tasks supporting RRM and RLM measurement for eMTC in a shared spectrum).

The memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The software 930 may include code to implement aspects of the present disclosure, including code to support RRM and RLM measurement for eMTC in a shared spectrum. The software 930 may be stored in a non-transitory computer-readable medium such as system memory or other memory. In some cases, the software 930 may not be directly executable by the processor but may cause a computer (e.g., when compiled and executed) to perform functions described herein.

The transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

The network communications manager 945 may manage communications with the core network (e.g., via one or more wired backhaul links). For example, the network communications manager 945 may manage the transfer of data communications for client devices, such as one or more UEs 115.

The inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to the UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between the base stations 105.

Figure 10:
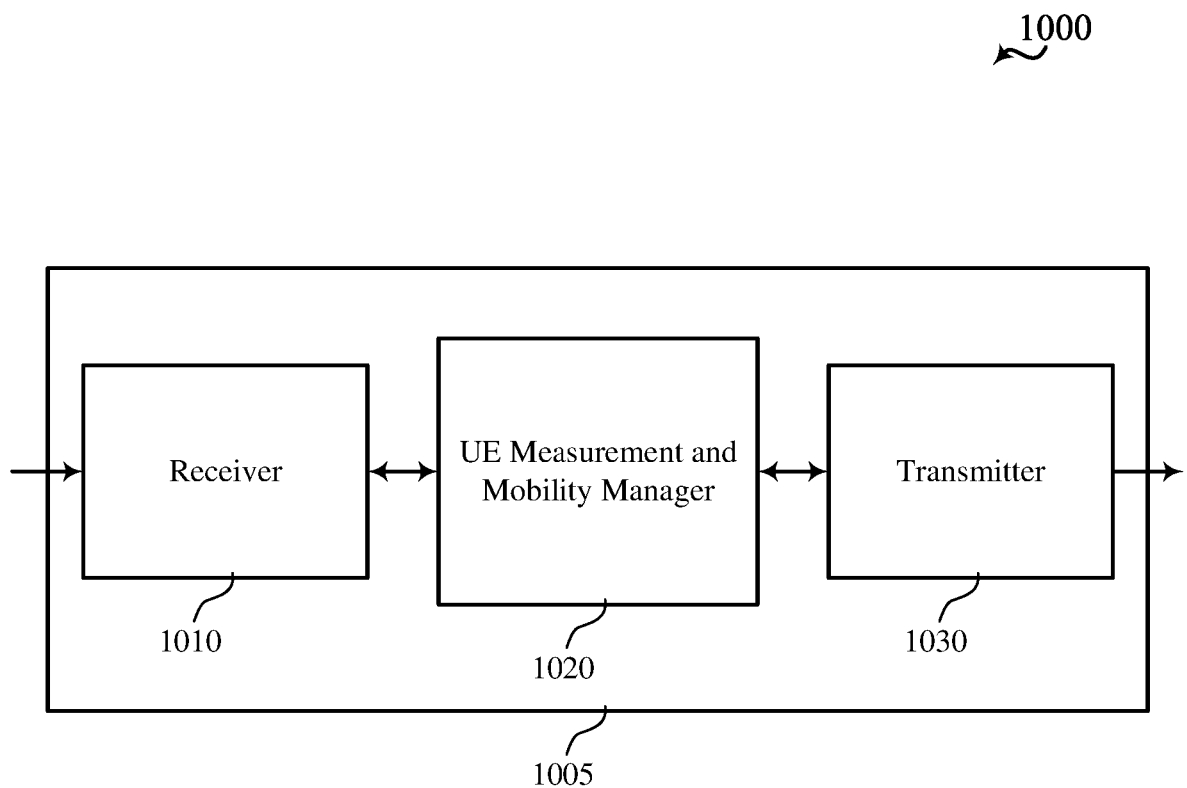
FIGS. 10 and 11 illustrate block diagrams of a device that supports RRM and RLM for eMTC in a shared spectrum in accordance with aspects of the present disclosure.

FIG. 10 shows a block diagram 1000 of a wireless device 1005 that supports RRM and RLM for eMTC in a shared spectrum in accordance with aspects of the present disclosure. The wireless device 1005 may be an example of aspects of a UE 115 as described herein. The wireless device 1005 may include a receiver 1010, UE measurement and mobility manager 1020, and transmitter 1030. The wireless device 1005 may also include a processor. Each of these components may be in communication with one another (e.g., via one or more buses).

The receiver 1010 may receive information such as packets, user data, or control information associated with various information channels (e.g., control channels, data channels, and information related to RRM and RLM for eMTC in a shared spectrum, etc.). Information may be passed on to other components of the device. The receiver 1010 may be an example of aspects of the transceiver 1235 described with reference to FIG. 12. The receiver 1010 may utilize a single antenna or a set of antennas.

The UE measurement and mobility manager 1020 may be an example of aspects of the UE measurement and mobility manager 1215 described with reference to FIG. 12.

The UE measurement and mobility 1020 and/or at least some of its various sub-components may be implemented in hardware, software executed by a processor, firmware, or any combination thereof. If implemented in software executed by a processor, the functions of the UE measurement and mobility manager 1020 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE measurement and mobility manager 1020 and/or at least some of its various sub-components may be physically located at various positions, including being distributed such that portions of functions are implemented at different physical locations by one or more physical devices. In some examples, the UE measurement and mobility manager 1020 and/or at least some of its various sub-components may be a separate and distinct component in accordance with various aspects of the present disclosure. In other examples, the UE measurement and mobility manager 1020 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE measurement and mobility manager 1020 may receive a configuration for cell measurement associated with a frequency hopping system, may generate a measurement report based on the configuration, and may transmit the measurement report.

The transmitter 1030 may transmit signals generated by other components of the device. In some examples, the transmitter 1030 may be collocated with a receiver 1010 in a transceiver module. For example, the transmitter 1030 may be an example of aspects of the transceiver 1235 described with reference to FIG. 12. The transmitter 1030 may utilize a single antenna or a set of antennas.

Figure 11:
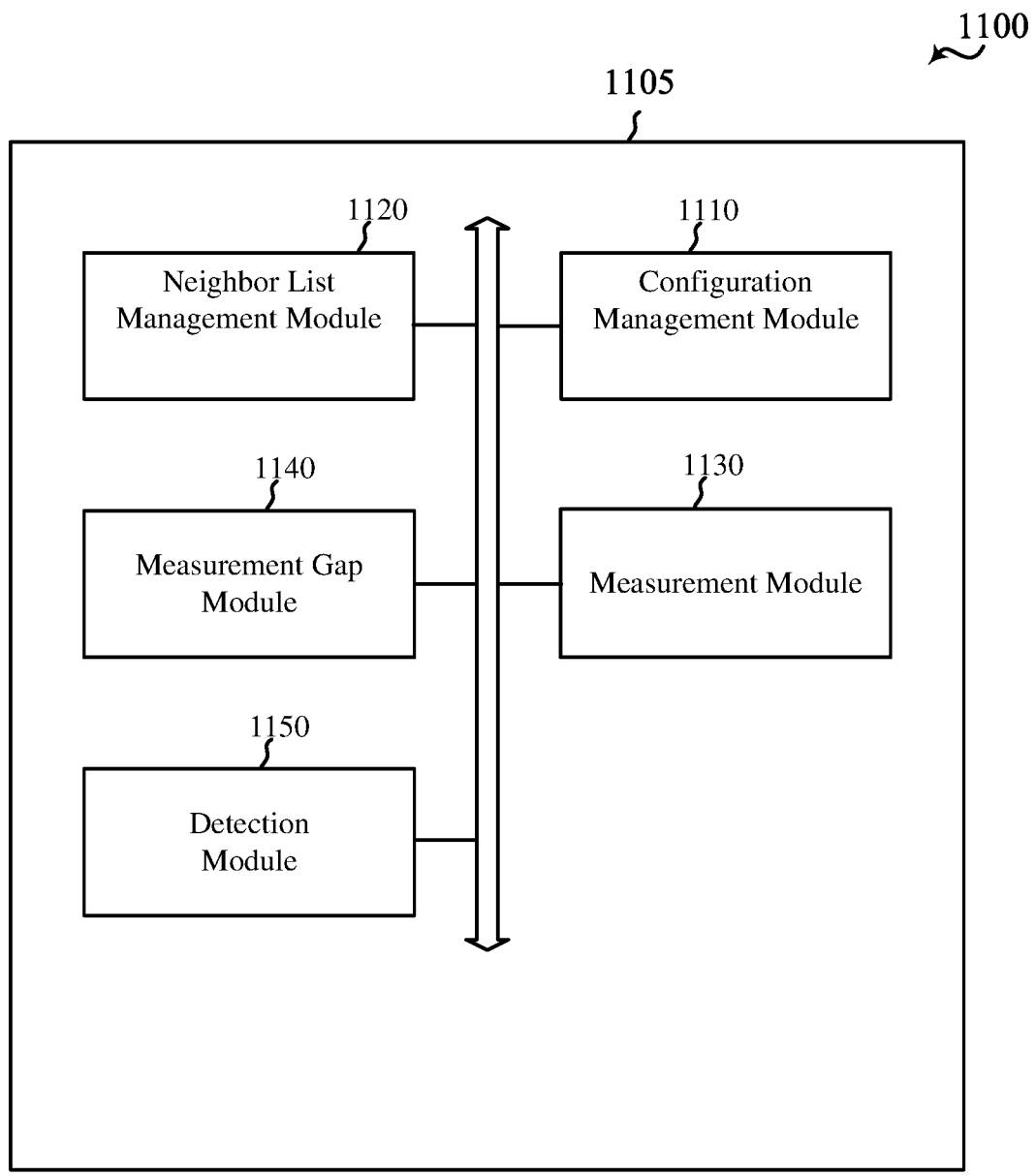

FIG. 11 shows a block diagram 1100 of a wireless device 1105 that supports RRM and RLM for eMTC in a shared spectrum in accordance with aspects of the present disclosure. The wireless device 1105 may be an example of aspects of the wireless device 1005 or the UE 115 as described herein. The wireless device 1105 may include a configuration management module 1110, neighbor list management module 1120, measurement module 1130, measurement gap module 1140, and detection module 1150. The wireless device 1105 may also include a processor. Each of these components may be in communication with one another (e.g., via one or more buses).

The configuration management module 1110 may maintain a configuration for cell measurement associated with a frequency hopping system. The configuration may include various examples as described herein.

The neighbor list management module 1120 may maintain a neighbor list associated with a frequency hopping system. The neighbor list may include information associated with a neighbor cell in a frequency hopping system, such as cell ID, channel list, and hopping pattern associated with the channel list.

The measurement module 1130 may receive a configuration for cell measurement such as RSRQ measurement, RSRP measurement, RSSI measurement, RLM measurement, SINR, or the like. The measurement module 1130 may manage the measurements The measurement gap module 1140 may receive a configuration for a measurement gap per neighbor cell or per group of cells. The configuration may include a measurement gap for the DRS, a measurement gap for the data channel, a combined measurement gap for both the DRS and data channel, a long measurement gap for the DRS of all neighbor cells, or some combination thereof.

The detection module 1150 may detect transmissions of neighbor cells associated with a frequency hopping system. The transmissions may include the DRS, data channel, or the like. The detection module 1150 may detect other type of transmissions such as LAA, LTE-U, WiFi, Bluetooth, or other radio access technologies operating in a shared spectrum.

Figure 12:
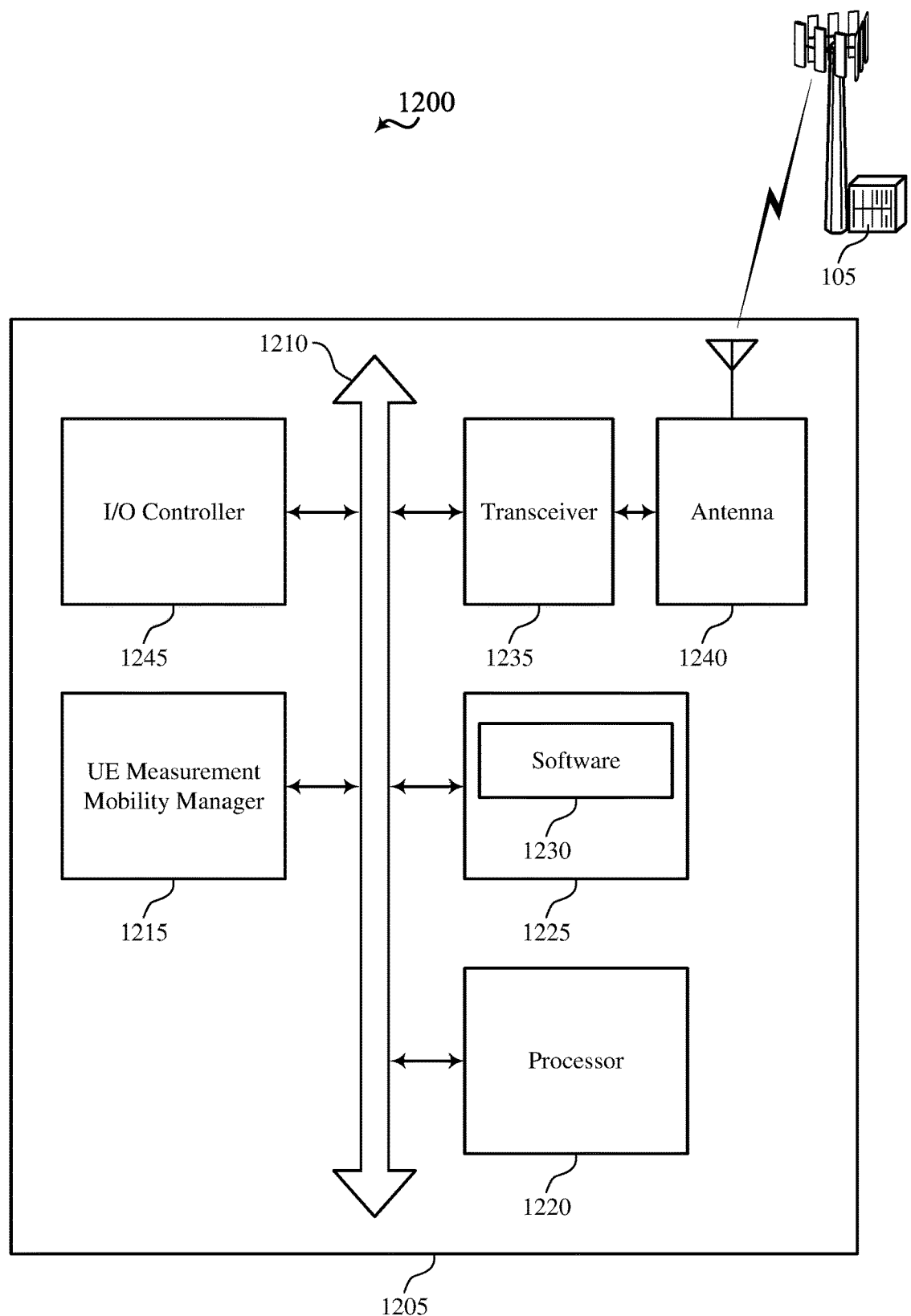
FIG. 12 illustrates a block diagram of a system including a UE that supports RRM and RLM for eMTC in a shared spectrum in accordance with aspects of the present disclosure.

FIG. 12 shows a diagram of a system 1200 including a device 1205 that supports RRM and RLM for eMTC in a shared spectrum in accordance with aspects of the present disclosure. The device 1205 may be an example of or include the components of the UE 115 as described herein. The device 1205 may include components for bi-directional voice and data communications including components for transmitting and receiving communications, including a UE measurement and mobility manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

The processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1220 may be configured to operate a memory array using a memory controller. In other cases, a memory controller may be integrated into the processor 1220. The processor 1220 may be configured to execute computer-readable instructions stored in a memory to perform various functions (e.g., functions or tasks supporting RRM and RLM for eMTC in a shared spectrum).

The memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

The software 1230 may include code to implement aspects of the present disclosure, including code to support RRM and RLM for eMTC in a shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

The transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the device 1205 may include a single antenna 1240. However, in some cases the device 1205 may have more than one antenna 1240, which may be capable of concurrently transmitting or receiving multiple wireless transmissions.

The I/O controller 1245 may manage input and output signals for the device 1205. The I/O controller 1245 may also manage peripherals not integrated into the device 1205. In some cases, I/O controller 1245 may represent a physical connection or port to an external peripheral. In some cases, the I/O controller 1245 may utilize an operating system such as iOS®, ANDROID®, MS-DOS®, MS-WINDOWS®, OS/2®, UNIX®, LINUX®, or another known operating system. In other cases, the I/O controller 1245 may represent or interact with a modem, a keyboard, a mouse, a touchscreen, or a similar device. In some cases, the I/O controller 1245 may be implemented as part of a processor. In some cases, a user may interact with the device 1205 via the I/O controller 1245 or via hardware components controlled by the I/O controller 1245.

Figure 13:
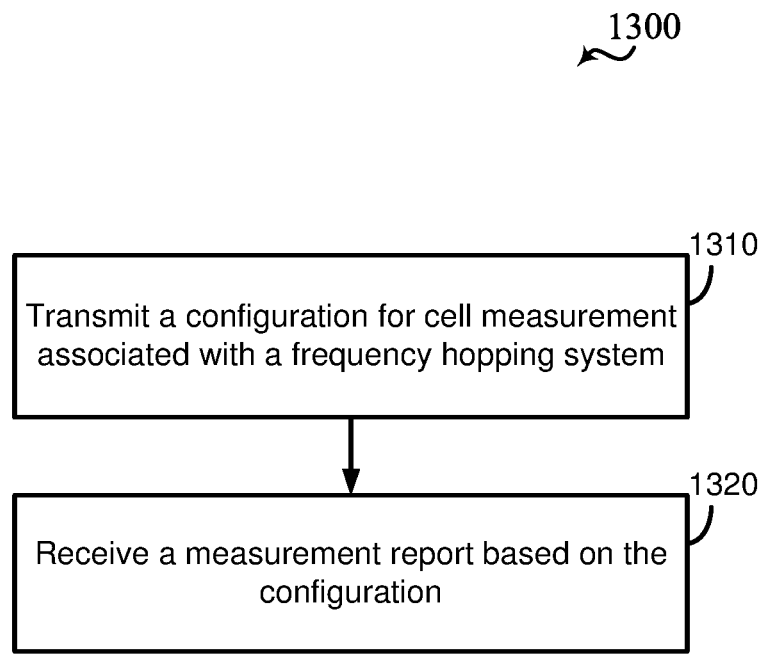
FIGS. 13 through 18 illustrate methods for supporting RRM and RLM for eMTC in a shared spectrum in accordance with aspects of the present disclosure.

FIG. 13 shows a flowchart illustrating a method 1300 for supporting RRM and RLM for eMTC in a shared spectrum in accordance with aspects of the present disclosure. The operations of method 1300 may be implemented by a base station 105 or its components as described herein. For example, the operations of method 1300 may be performed by the receiver 720 and transmitter 740 as described with reference to FIG. 7, or transceiver 935 as described with reference to FIG. 9. In some examples, the base station 105 may execute a set of codes to control the functional elements of the device to perform the functions described below. Additionally or alternatively, the base station 105 may perform aspects of the functions described below using special-purpose hardware.

At block 1310, the base station 105 may transmit a configuration for cell measurement associated with a frequency hopping station. The base station 105 may send the configuration in an RRC message or the like. The operations of block 1310 may be performed according to the methods described herein.

At block 1320, the base station 105 may receive a measurement report based on the configuration. The operations of block 1320 may be performed according to the methods described herein.

Figure 14:
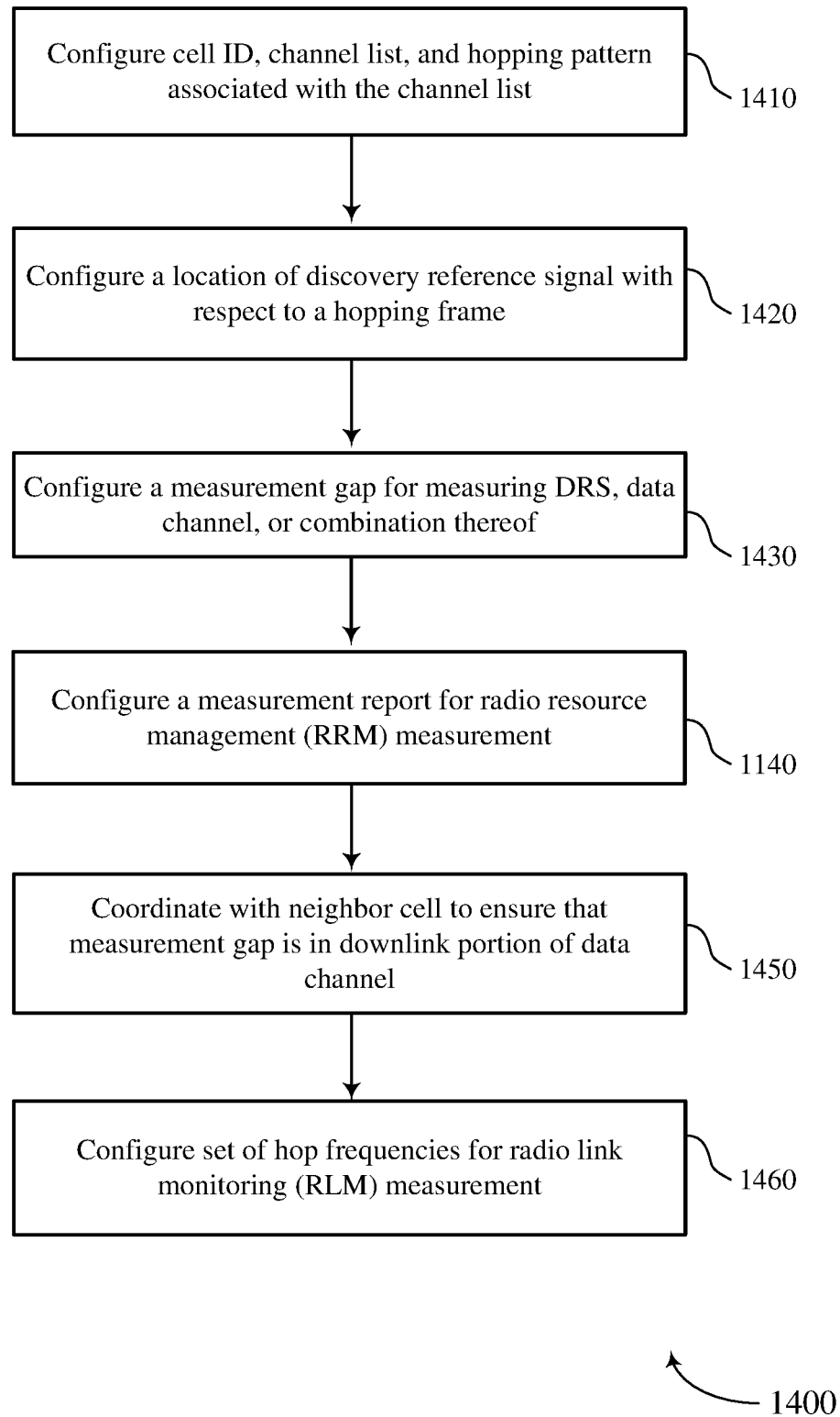

FIG. 14 shows a flowchart illustrating a method 1400 for supporting RRM and RLM for eMTC in a shared spectrum in accordance with aspects of the present disclosure. The operations of method 1400 may be implemented by a base station 105 or its components as described herein. For example, the operations of the method 1400 may be performed by the measurement and mobility manager 730 as described with reference to FIG. 7, or the UE configuration module 810 as descried with reference to FIG. 8, or the base station measurement and mobility manager 915 as described with reference to FIG. 9. In some examples, the base station 105 may execute a set of codes to control the functional elements of the device to perform the functions described below. Additionally or alternatively, the base station 105 may perform aspects of the functions described below using special-purpose hardware.

At block 1410, the base station 105 may configure cell ID, channel list, and hopping pattern associated with the channel list. In some examples, the configuration may be on a per cell basis. In some other examples, the configuration may be on a per group of cells basis. The operations of block 1410 may be performed according to the methods described herein.

At block 1420, the base station 105 may configure a location of discovery reference signal with respect to a hopping frame. In some examples, the hopping frame may be related to hopping pattern associated with a channel list. The operations of block 1420 may be performed according to the methods described herein.

At block 1430, the base station 105 may configure a measurement gap for measuring DRS, data channel, or combination thereof. In some examples, the measurement gap may be associated with a neighbor cell or a group of neighbor cells. In some other examples, the DRS may include PSS/SSS and PBCH. In still other examples, the data channel may include a TDD configuration. The operations of block 1430 may be performed according to the methods described herein.

At block 1440, the base station 105 may configure a measurement report for RRM measurement. In some examples, the measurement report may include RSRQ measurement, RSRP measurement, RSSI measurement, or combination thereof. In some other examples, the measurement report may include a combined measurement of different signals, such as PSS/SSS, PBCH, data channel, or combination thereof. The operations of block 1440 may be performed according to the methods described herein.

At block 1450, the base station 105 may coordinate with neighbor cell to ensure that measurement gap is in downlink portion of data channel. In some other embodiments, base station may configure measurement gap only in a guaranteed downlink portion of data channel. The operations of block 1450 may be performed according to the methods described herein.

At block 1460, the base station 105 may configure a set of hop frequencies for RLM measurement. In some examples, RLM measurement may include SINR of a best channel, worst channel, median channel, or combination thereof. In some other examples, base station may configure an indication to combine SINR or PSS/SSS with SINR of data channel. In still other examples, base station may configure an indication to compute average SINR of last N hop frequencies. The operations of block 1460 may be performed according to the methods described herein.

Figure 15:
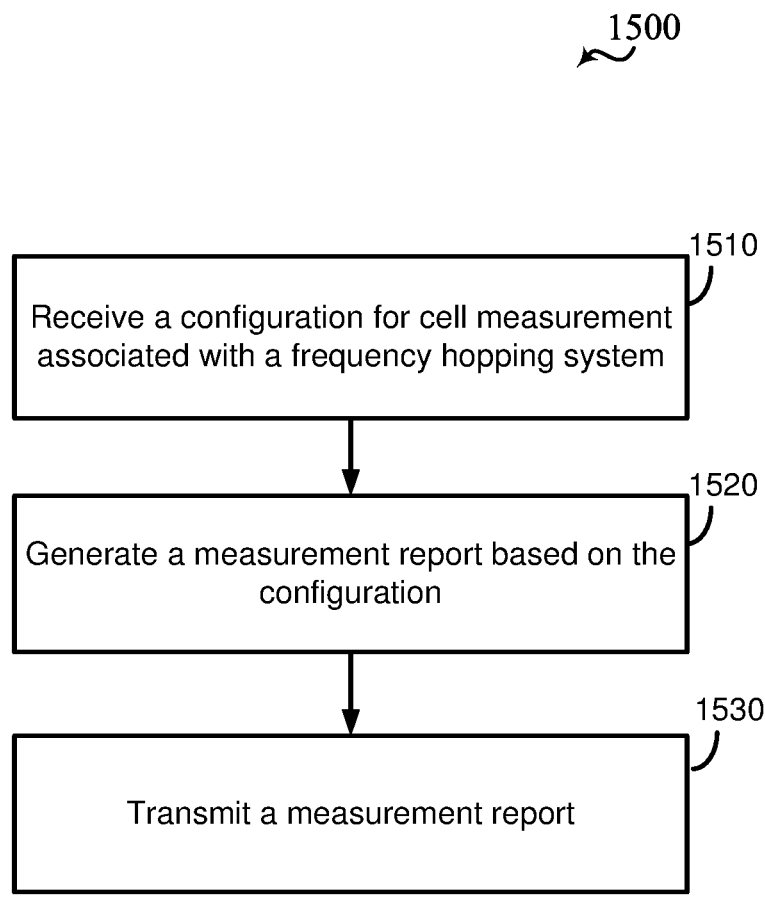

FIG. 15 shows a flowchart illustrating a method 1500 for supporting RRM and RLM for eMTC in a shared spectrum in accordance with aspects of the present disclosure. The operations of method 1500 may be implemented by a UE 115 or its components as described herein. For example, the operations of method 1500 may be performed by the receiver 1010, UE measurement and mobility manager 1020, and transmitter 1030 as described with reference to FIG. 10, or configuration management module 1110 as described with reference to FIG. 11, or UE measurement and mobility manager 1215 and transceiver 1235 as described with reference to FIG. 12. In some examples, the UE 115 may execute a set of codes to control the functional elements of the device to perform the functions described below.

Additionally or alternatively, the UE 115 may perform aspects of the functions described below using special-purpose hardware.

At block 1510, the UE 115 may receive a configuration for cell measurement associated with a frequency hopping system. The configuration may be received in an RRC message or the like. The operations of block 1510 may be performed according to the methods described herein.

At block 1520, the UE 115 may generate a measurement report based on the configuration. The operations of block 1520 may be performed according to the methods described herein.

At block 1530, the UE 115 may transmit the measurement report. UE may transmit the measurement report to serving base station. The operations of block 1530 may be performed according to the methods described herein.

Figure 16:
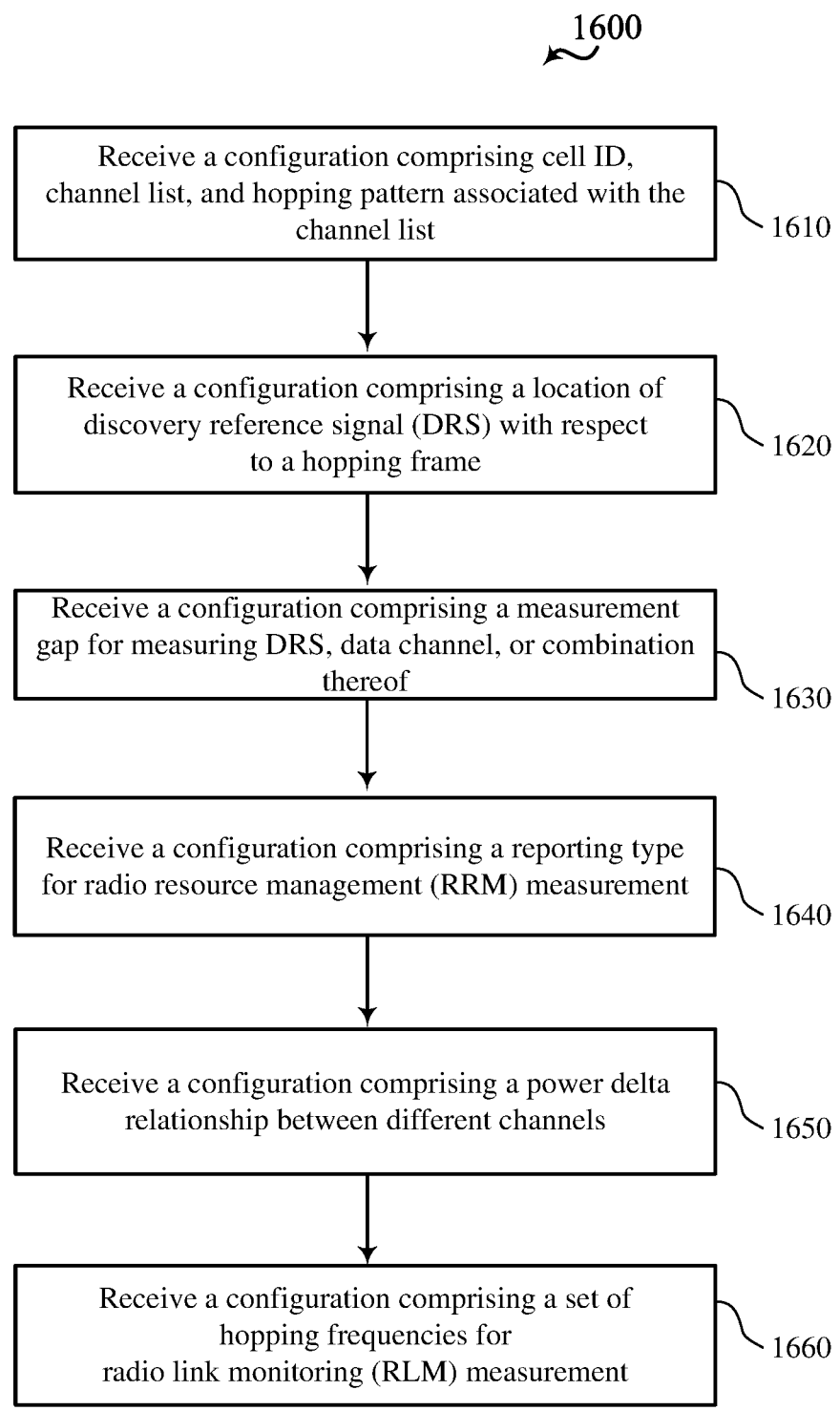

FIG. 16 shows a flowchart illustrating a method 1600 for supporting RRM and RLM for eMTC in a shared spectrum in accordance with aspects of the present disclosure. The operations of method 1600 may be implemented by a UE 115 or its components as described herein. For example, the operations of method 1600 may be performed by the receiver 1010 and UE measurement and mobility manager 1020 as described with reference to FIG. 10, or configuration management module 1110, neighbor list management module 1120, measurement module 1130, and measurement gap module 1140 as described with reference to FIG. 11, or transceiver 1235 and UE measurement and mobility manager 1215 as described with reference to FIG. 12. In some examples, the UE 115 may execute a set of codes to control the functional elements of the device to perform the functions described below. Additionally or alternatively, the UE 115 may perform aspects of the functions described below using special-purpose hardware.

At block 1610, the UE 115 may receive a configuration comprising cell ID, channel list, and hopping pattern associated with the channel list. In some examples, the configuration may be on a per cell basis. In some other examples, the configuration may be on a per group of cells basis. The operations of block 1610 may be performed according to the methods described herein.

At block 1620, the UE 115 may receive a configuration comprising a location of a discover reference signal (DRS) with respect to a hopping frame. In some examples, the hopping frame may be related to hopping pattern associated with a channel list. The operations of block 1620 may be performed according to the methods described herein.

At block 1630, UE 115 may receive a configuration comprising a measurement for measuring the DRS, data channel, or combination thereof. In some examples, the measurement gap may be associated with a neighbor cell or a group of neighbor cells. In some other examples, the DRS may include PSS/SSS and PBCH. In still other examples, the data channel may include a TDD configuration. The operations of block 1630 may be performed according to the methods described herein.

At block 1640, the UE 115 may receive a configuration comprising a reporting type for RRM measurement. In some examples, the reporting type may include RSRQ measurement, RSRP measurement, RSSI measurement, or combination thereof. In some other examples, the reporting type may include a combined measurement of different signals, such as PSS/SSS, PBCH, data channel, or combination thereof. The operations of block 1640 may be performed according to the methods described herein.

At block 1650, the UE 115 may receive a power delta relationship between different channels. In some examples, the power delta relationship may be between PSS/SSS and PBCH. In some other examples, the power delta relationship may be between DRS and data channel. The operations of block 1650 may be performed according to the methods described herein.

At block 1660, the UE 115 may obtain system acquisition information for a base station based at least in part on a combination of the first synchronization sequence and the second synchronization sequence. The operations of block 1660 may be performed according to the methods described herein.

Figure 17:
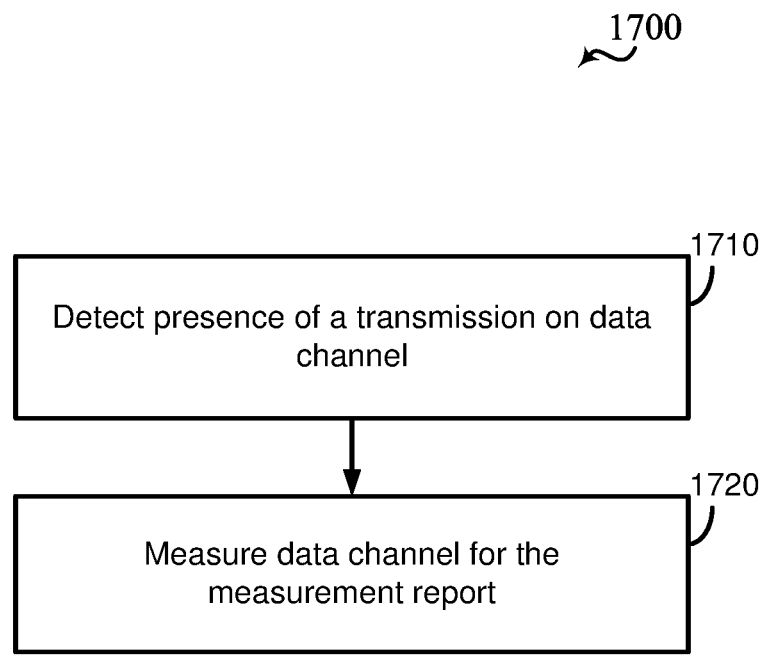

FIG. 17 shows a flowchart illustrating a method 1700 for supporting RRM and RLM for eMTC in a shared spectrum in accordance with aspects of the present disclosure. The operations of method 1700 may be implemented by a UE 115 or its components as described herein. For example, the operations of method 1700 may be performed by a UE measurement and mobility manager 1020 as described with reference to FIG. 10, or detection module 1150 and measurement module 1130 as described with reference to FIG. 11, or UE measurement and mobility manager 1215 as described with reference to FIG. 12. In some examples, the UE 115 may execute a set of codes to control the functional elements of the device to perform the functions described below. Additionally or alternatively, the UE 115 may perform aspects of the functions described below using special-purpose hardware.

At block 1710, the UE 115 may detect presence of a transmission on data channel In some examples, UE may detect a common reference signal or cell-specific reference signal (CRS). In some other examples, UE may detect a preamble or beacon signal. The operations of block 1710 may be performed according to the methods described herein.

At block 1720, the UE 115 may measure data channel for the measurement report. In some examples, UE 115 may measure CRS or other reference signal carried on the data channel. The operations of block 1720 may be performed according to the methods described herein.

Figure 18:
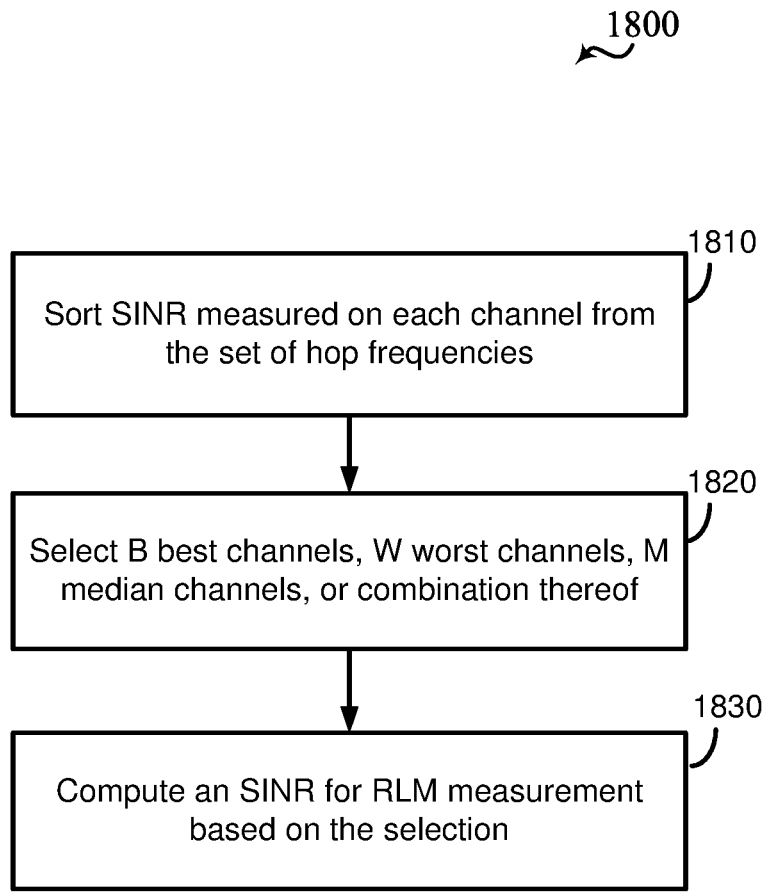

FIG. 18 shows a flowchart illustrating a method 1800 for supporting RRM and RLM for eMTC in a shared spectrum in accordance with aspects of the present disclosure. The operations of method 1800 may be implemented by a UE 115 or its components as described herein. For example, the operations of method 1800 may be performed by a UE measurement and mobility manager 1020 as described with reference to FIG. 10, or detection module 1150 and measurement module 1130 as described with reference to FIG. 11, or UE measurement and mobility manager 1215 as described with reference to FIG. 12. In some examples, the UE 115 may execute a set of codes to control the functional elements of the device to perform the functions described below. Additionally or alternatively, the UE 115 may perform aspects of the functions described below using special-purpose hardware.

At block 1810, the UE 115 may sort SINR measured on each channel from set of hop frequencies. In some examples, UE 115 may measure SINR on each channel of the configured set, and may sort SINR from the best channel to the worst channel. The operations of block 1810 may be performed according to the methods described herein.

At block 1820, the UE 115 may select B best channels, W worst channels, M median channels, or combination thereof. Parameters B, W, and M are integers. In some examples, UE 115 may select the channel with the best SINR (e.g., best channel). In some other examples, UE 115 may select the channel with the worst SINR (e.g., worst channel). In still other examples, UE 115 may select the channel with the median SINR (e.g., median channel). The operations of block 1820 may be performed according to the methods described herein.

At block 1830, the UE 115 may compute an SINR for RLM measurement based on the selection at block 1820. The operations of block 1830 may be performed according to the methods described herein.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. It should be noted that the base stations may be deployed by the same operator or different operators. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting a configuration for cell measurement associated with a frequency hopping system;
   configuring a cell identification (ID) of at least one neighbor cell, a channel list associated with the at least one neighbor cell, and a hopping pattern associated with the channel list;
   configuring a location of a discovery reference signal (DRS) with respect to a hopping frame corresponding to the hopping pattern; and
   receiving a measurement report based on the configuration.

2. A method for wireless communication, comprising:
   transmitting a configuration for cell measurement associated with a frequency hopping system;
   configuring at least one measurement gap for measuring a discovery reference signal (DRS), wherein
   the at least one measurement gap is associated with a neighbor cell or a group of neighbor cells,
   the DRS comprises a primary synchronization signal (PSS)/a secondary synchronization signal (SSS) and a physical broadcast channel (PBCH), and
   the DRS is transmitted on an anchor channel; and
   receiving a measurement report based on the configuration.

3. A method for wireless communication, comprising:
   transmitting a configuration for cell measurement associated with a frequency hopping system;
   configuring one or more hop frequencies for radio link monitoring (RLM) measurement using at least an anchor channel; and
   receiving a measurement report based on the configuration.

4. A method of wireless communication, comprising:
   receiving a configuration for cell measurement associated with a frequency hopping system, wherein the configuration comprises a cell identification (ID) of at least one neighbor cell, a channel list associated with the at least one neighbor cell, a hopping pattern associated with the channel list, and a location of a discovery reference signal (DRS) with respect to a hopping frame corresponding to the hopping pattern;
generating a measurement report based on the configuration; and
transmitting the measurement report.

5. A method of wireless communication, comprising:
receiving a configuration for cell measurement associated with a frequency hopping system, wherein the configuration comprises at least one measurement gap for measuring a discovery reference signal (DRS) and wherein
the DRS comprises a primary synchronization signal (PSS)/a secondary synchronization signal (SSS) and a physical broadcast channel (PBCH), and
the DRS is transmitted on an anchor channel;
generating a measurement report based on the configuration; and
transmitting the measurement report.

6. A method of wireless communication, comprising:
receiving a configuration for cell measurement associated with a frequency hopping system, wherein the configuration comprises at least one measurement gap for measuring a discovery reference signal (DRS) and a data channel, the at least one measurement gap comprising a first measurement gap and a second measurement gap;
detecting the DRS of at least one neighbor cell in the first measurement gap;
measuring the data channel of the at least one neighbor cell in the second measurement gap for a measurement report;
generating the measurement report based on the configuration; and
transmitting the measurement report.

7. A method of wireless communication, comprising:
receiving a configuration for cell measurement associated with a frequency hopping system, wherein the configuration comprises one or more hop frequencies for radio link monitoring (RLM) measurement using at least an anchor channel;
generating a measurement report based on the configuration; and
transmitting the measurement report.

8. The method of claim 7, further comprising receiving an indication of a number of channels from the set of hop frequencies for measuring SINR.

9. An apparatus for wireless communication, comprising:
a processor;
a transceiver;
a memory in communications with the processor, wherein the processor and the memory are configured to:
transmit, via the transceiver, a configuration for cell measurement associated with a frequency hopping system,
configure a cell identification (ID) of at least one neighbor cell, a channel list associated with the at least one neighbor cell, and a hopping pattern associated with the channel list;
configure at least one measurement gap for measuring a discovery reference signal (DRS), wherein
the DRS comprises a primary synchronization signal (PSS)/a secondary synchronization signal (SSS) and a physical broadcast channel (PBCH), and
the DRS is transmitted on an anchor channel; and
receive, via the transceiver, a measurement report based on the configuration.

10. An apparatus for wireless communication, comprising:
a processor;
a transceiver;
a memory in communications with the processor, wherein the processor and the memory are configured to:
transmit, via the transceiver, a configuration for cell measurement associated with a frequency hopping system,
configure one or more hop frequencies for radio link monitoring (RLM) measurement using at least an anchor channel, and
receive, via the transceiver, a measurement report based on the configuration.

11. An apparatus for wireless communication, comprising:
a processor;
a transceiver;
a memory in communications with the processor, wherein the processor and the memory are configured to:
receive, via the transceiver, a configuration for cell measurement associated with a frequency hopping system, wherein the configuration comprises at least one measurement gap for measuring a discovery reference signal (DRS) and wherein
the DRS comprises a primary synchronization signal (PSS)/a secondary synchronization signal (SSS) and a physical broadcast channel (PBCH), and
the DRS is transmitted on an anchor channel,
generate a measurement report based on the configuration, and
transmit, via the transceiver, the measurement report.

12. An apparatus for wireless communication, comprising:
a processor;
a transceiver;
a memory in communications with the processor, wherein the processor and the memory are configured to:
receive, via the transceiver, a configuration for cell measurement associated with a frequency hopping system, wherein the configuration comprises one or more hop frequencies for radio link monitoring (RLM) measurement using at least an anchor channel,
generate a measurement report based on the configuration, and
transmit the measurement report.

* * * * *